(12) United States Patent
Sasai et al.

(10) Patent No.: US 6,459,519 B1
(45) Date of Patent: Oct. 1, 2002

(54) OPTICAL TRANSMITTER-RECEIVER

(75) Inventors: Hiroyuki Sasai, Katano; Kazuki Maeda, Neyagawa; Kuniaki Utsumi, Sanda, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/056,611

(22) Filed: Apr. 8, 1998

(30) Foreign Application Priority Data

Apr. 9, 1997 (JP) ............................................. 9-090658
Jul. 31, 1997 (JP) ............................................. 9-206785

(51) Int. Cl.$^7$ .............................................. H04B 10/04
(52) U.S. Cl. ...................................................... 359/181
(58) Field of Search ................................ 359/180, 181, 359/188, 145

(56) References Cited

U.S. PATENT DOCUMENTS

| | | | | |
|---|---|---|---|---|
| 5,315,426 A | * | 5/1994 | Aoki ........................... | 359/180 |
| 5,432,632 A | * | 7/1995 | Watanabe .................... | 359/191 |
| 5,596,436 A | | 1/1997 | Sargis et al. ................. | 359/132 |
| 5,710,651 A | * | 1/1998 | Logan, Jr. .................... | 359/145 |

FOREIGN PATENT DOCUMENTS

JP 5-3456 1/1993

OTHER PUBLICATIONS

Hiroyo Ogawa, "Microwave and Millimeter–Wave Fiber Optic Technologies for Subcarrier Transmission Systems", IEICE Transactions on Communications, vol. E76 B, No. 9, pp. 1078–1090, Sep. 1993.

Hikari Tsushin Gijyutsu Dokuhon (Optical Transmission Technical Book), Chapter 2, "Practice of Optical Communication System," edited by Shimada, A Ohm Publishing co., Ltd. 1980.

* cited by examiner

*Primary Examiner*—Leslie Pascal
*Assistant Examiner*—Dalzid Singh
(74) *Attorney, Agent, or Firm*—Wenderoth, Lind & Ponack, L.L.P.

(57) ABSTRACT

A modulated electrical signal Smod produced upon amplitude-modulating a subcarrier having a high frequency (for example, a millimeter-wave band) by a baseband signal SBB to be transmitted and a main carrier MC outputted from a light source are inputted to an external optical modulating portion in an optical transmitter. The external optical modulating portion amplitude-modulates the main carrier MC by the modulated electrical signal Smod, to output a double-modulated optical signal OSdmod to an optical filter portion. The optical filter portion passes only a component of one of sidebands included in the double-modulated optical signal OSdmod, and outputs the component to an optical fiber as an optical signal OS. An optical/electrical converting portion in an optical receiver optical/electrical-converts the optical signal OS transmitted through the optical fiber, to directly obtain a baseband signal SBB. Consequently, the optical receiver is constructed simply and at low cost without requiring a wideband optical/electrical converting element for optical/electrical-converting a high-frequency electrical signal and a high-frequency electrical component (a frequency converter, a demodulator, a semirigid cable or a waveguide) which is very high in cost or is difficult to process.

19 Claims, 18 Drawing Sheets

(a-3); OPTICAL SPECTRUM OF MODULATED OPTICAL SIGNAL OSmod (b-3); OPTICAL SPECTRUM OF DOUBLE-MODULATED OPTICAL SIGNAL OSdmod (a-15); OPTICAL SPECTRUM OF FIRST UNMODULATED LIGHT UML1

(b-15); OPTICAL SPECTRUM OF MODULATED OPTICAL SIGNAL OSmod (c-15); OPTICAL SPECTRUM OF SECOND UNMODULATED LIGHT UML2

(d-15); OPTICAL SPECTRUM OF OPTICAL SIGNAL OS

OPTICAL TRANSMITTER-RECEIVER

BACKGROUND OF THE INVENTION

1. Field of the Invention

The present invention relates generally to an optical transmitter-receiver, and more particularly, to an optical transmitter-receiver in which an optical transmitter and an optical receiver are interconnected such that optical transmission is possible.

2. Description of the Background Art

Optical transmission for transmitting information with light modulated by the information has been expected to be widely used for a future high speed communication network due to low-loss and wideband properties. For example, an optical transmitter-receiver for optically transmitting an electrical signal having a high-frequency (hereinafter referred to as a first optical transmitter-receiver), and an optical transmitter-receiver for optically transmitting a baseband signal (hereinafter referred to as a second optical transmitter-receiver), have been proposed. The two optical transmitter-receivers will be specifically described referring to the drawings.

Description is now made of the first optical transmitter-receiver. In recent years, a wireless service such as a portable telephone or a PHS (Personal Handyphone System) has been rapidly enlarged. Therefore, utilization of still higher frequencies has been examined. A mirco-cell system or a pico-cell system utilizing a millimeter-wave band of approximately 30 GHz to 300 GHz has been examined. In such a cell system, a signal having a high frequency such as a millimeter-wave band is radiated from a lot of base stations connected to a control station, so that a wireless service is provided. The cell system has various advantages. First, the signal having the millimeter-wave band does not easily adversely affect next cells due to a propagation loss in a space. Second, the signal having the millimeter-wave band has a short wavelength, so that an antenna or the like set in the control station or the like is miniaturized. Third, the signal having the millimeter-wave band has a high frequency, so that the transmission capacity can be increased. Consequently, it may be possible to provide a high speed transmission service which is difficult to realize in a conventional wireless service.

In a wireless communication system to which such a cell system is applied, however, a lot of base stations are set throughout a town. Therefore, the base station must be small in size and low in cost. A first optical transmitter-receiver employing a so-called subcarrier optical transmission system which has been tremendously researched and developed in recent years may, in some cases, be applied to the wireless communication system. The subcarrier optical transmission system is described in detail in "Microwave and millimeter-wave fiber, optic technologies for subcarrier transmission systems" (Hiroyo Ogawa, IEICE Transactions on Communications, Vol. E76-B, No. 9, pp. 1078–1090, September, 1993), for example.

In the subcarrier transmission system, the intensity of a main carrier, which is typically unmodulated light, is modulated by a modulated signal so that an optical signal is obtained. In the modulated signal a subcarrier is modulated by information, which is a voice signal and/or an image signal. The change in the intensity of the optical signal uniquely corresponds to the change in the amplitude, the change in the frequency or the change in the phase of the modulated signal. In the subcarrier optical transmission system, an optical fiber, which is very low in loss, is used. When the modulated signal has a millimeter-wave band, therefore, the modulated signal can be transmitted to a remote location as it is.

FIG. 17 is a block diagram showing the structure of a typical first optical transmitter-receiver. In FIG. 17, the first optical transmitter-receiver comprises a light source 110, an external optical modulating portion 120, an optical fiber 140, an optical/electrical converting portion 150, a frequency converting portion 1710, and a demodulating portion 1720. The light source 110 and the external optical modulating portion 120 constitute an optical transmitter 101, and are set in a base station, while the optical/electrical converting portion 150, the frequency converting portion 1710, and the demodulating portion 1720 constitute an optical receiver 102, and are set in a control station. FIG. 17 shows only signal path in the one direction, that is, the signal path transmitted from the base station to the control station.

In the first optical transmitter-receiver, an electrical signal to be transmitted from the base station to the control station is typically a modulated electrical signal Smod having a millimeter-wave band in which a subcarrier is modulated by a baseband signal such as a voice signal and/or an image signal. The modulated electrical signal Smod is inputted to the external optical modulating portion 120 in the light transmitter 101 through an antenna or an amplifier (not shown) from a portable telephone, a PHS terminal, or the like which is moved outside the base station. The light source 110 oscillates using unmodulated light as a main carrier Mc. The main carrier Mc is also inputted to the external optical modulating portion 120. The external optical modulating portion 120 performs external light-intensity modulation, to modulate the intensity of the inputted main carrier MC on the basis of the change in the amplitude of the inputted modulated electrical signal Smod, thereby obtaining an optical signal OSmod. The optical signal OSmod itself outputted from the external optical modulating portion 120 to the optical fiber 140 is changed into a carrier, and is incident on the optical/electrical converting portion 150 in the optical receiver 102 while the modulated electrical signal Smod is being conveyed through the optical fiber 140 as it is. The optical/electrical converting portion 150 performs optical/electrical conversion, to convert the incident optical signal OSmod into an electrical signal including its intensity modulation component. The frequency converting portion 1710 down-coverts the electrical signal inputted from the optical/electrical converting portion 150 into an electrical signal having an intermediate frequency band. The demodulating portion 1720 demodulates the information of the baseband signal such as the voice signal and/or the image signal on the basis of the electrical signal having the intermediate frequency band inputted from the frequency converting portion 1710.

Description is now made of the second optical transmitter-receiver for merely optically transmitting a baseband signal. FIG. 18 is a block diagram showing the structure of a typical second optical transmitter-receiver. In FIG. 18, the second optical transmitter-receiver comprises a light source driving portion 1810, a light source 110, an optical fiber 140, and an optical/electrical converting portion 150. The light source driving portion 1810 and the light source 110 constitute an optical transmitter 101, while the optical/electrical converting portion 150 constitutes an optical receiver 102. In the second optical transmitter-receiver, it is assumed that a baseband signal SBB to be transmitted from the optical transmitter 101 to the optical receiver 102 is digital information, which is a voice signal and/or an image signal, for example. The baseband signal SBB is inputted to the light source driving portion 1810. The light source driving portion 1810 drives the light source 110, and modulates the intensity of an optical signal outputted from the light source 110 on the basis of the inputted baseband signal SBB (a direct optical modulation system). The optical signal is transmitted through the optical fiber 140, and is then optical/electrical-converted in the optical/electrical converting portion 150, so that the original baseband signal SBB is obtained. Such a light transmission technique is general, and is described in Chapter 2 "Practice of Optical Communication System" of "Hikari Tsushin Gijyutsu Dokuhon (Optical Transmission Technical Book)" (edited by Shimada, Ohm Publishing Co., Ltd.) issued in 1980, for example.

However, the optical/electrical converting portion 150 and the frequency converting portion 1710 shown in FIG. 17 must accurately perform optical/electrical conversion and frequency conversion of a signal having a high frequency such as a millimeter-wave band, so that wideband characteristics are required. Otherwise the demodulating portion 1720 would not perform accurate demodulation processing. In the first optical transmitter-receiver, therefore, electrical components corresponding to a high frequency band are interconnected. For this connection, a dedicated connector, waveguide or semirigid cable is used. The waveguide or the semirigid cable is difficult to freely work, so that the first optical transmitter-receiver is difficult to manufacture. It is necessary to use a wave guide, in the case of an attempt to transmit an electrical signal having a high-frequency such as milliwave band with low loss, however, the size of the first transmitter-receiver becomes large, because the size of the waveguide is larger than the size of coaxial cable.

As described in the foregoing, the second optical transmitter-receiver (see FIG. 18) is frequently used for online transmitting the baseband signal SBB, which is digital information, by wire. On the other hand, it is examined whether or not the first optical transmitter-receiver (see FIG. 17) is applied to a wireless communication system. The first and second optical transmitter-receivers are thus examined as separate systems because they differ in their applications. The optical transmitter-receiver for simultaneously optically transmitting both a baseband signal and a high-frequency electrical signal has not been so examined. If a wavelength division multiplexing technique is used, however, such an optical transmitter-receiver can be constructed. That is, the optical signal outputted from the light source 110 shown in FIG. 18 and the optical signal outputted from the external optical modulating portion 120 shown in FIG. 17 are wavelength-division-multiplexed on the transmission side. A signal obtained by the wavelength division multiplexing (WDM) is transmitted through the optical fiber 140, and is separated on the side of optical receiving. Thereafter, signals obtained by the separation are then respectively optical/electrical-converted. Consequently, both the signals are simultaneously obtained on the receiving side. However, the optical transmitter-receiver to which a wavelength division multiplexing technique is applied must separate an optical signal obtained by accurate wavelength division multiplexing on the side of optical receiving. Therefore, a plurality of light sources 110 which differ in oscillation wavelength are required, so that significant cost is required to construct the optical transmitter-receiver.

U.S. Pat. No. 5,596,436 discloses an optical transmitter-receiver to which a subcarrier multiplex optical transmission system is applied, which has apparently similar portions to those in some of optical transmitter-receivers disclosed in the present application. In the optical transmitter-receiver according to the U.S. Patent, however, modulated electrical signals are respectively first produced by modulating subcarriers by baseband signals using mixers. A multiplexed signal is produced by multiplexing the modulated electrical signals by a combiner 40. An external optical modulator 46 modulates unmodulated light from a laser 44 by the multiplexed signal. The optical transmitter according to the U.S. Patent differs in structure from the optical transmitter 101 according to the present invention. That is, a single subcarrier is used in the optical transmitter 101 according to the present invention, while a plurality of subcarriers are used in the optical transmitter according to the U.S. Patent. Consequently, spectrums of optical signals outputted from both the optical transmitters differ from each other. In the optical signal according to the U.S. Patent, a component of a main carrier and a component of each of subcarriers are in close proximity to each other on an optical frequency axis. On the other hand, in an optical signal OS according to the present invention (as described later), a component of a main carrier and components of both sidebands are not in close proximity to each other. Consequently, the optical receiver according to the present invention produces such a significant technical effect that a component of a baseband signal SBB can be taken out more simply and accurately, as compared with that in the U.S. Patent.

SUMMARY OF THE INVENTION

Therefore, an object of the present invention is to provide an optical transmitter-receiver capable of optically transmitting a high-frequency electrical signal and being simple in manufacture and small in size.

Another object of the present invention is to provide an optical transmitter-receiver capable of simultaneously optically transmitting both a baseband signal and a high-frequency signal using the same light source.

The first aspect is directed to an optical transmitter-receiver in which an optical transmitter and an optical receiver are interconnected such that an optical transmission is possible, characterized by comprising: a double-modulating portion, to which a subcarrier modulated by an electrical signal to be transmitted is inputted from outside, for double-modulating a main carrier, which is unmodulated light having a predetermined optical frequency, by the inputted subcarrier, to produce and output a double-modulated optical signal, an optical spectrum of the double-modulated optical signal inputted from the double-modulating portion including a component of the main carrier at the predetermined optical frequency and further including components of an upper sideband and a lower sideband at frequencies spaced by the frequency of the subcarrier apart from the predetermined optical frequency, an optical filter portion for selectively passing an optical signal including the component of either one of the upper sideband and the lower sideband in the double-modulated optical signal inputted from the double-modulating portion; and an optical/electrical converting portion for optical/electrical-converting the optical signal inputted from the optical filter portion, to obtain the electrical signal to be transmitted, the optical transmitter comprising at least the local oscillating portion and the double-modulating portion, and the optical receiver comprising at least the optical/electrical converting portion, the optical filter portion being included in either one of the optical transmitter and the optical receiver.

According to the first aspect, the optical/electrical converting portion can directly obtain from the optical signal the electrical signal having a relatively low frequency to be transmitted, thereby eliminating the necessity of an electrical component, which is high in cost and is difficult to process, corresponding to a subcarrier band which is a relatively high frequency as in a conventional optical transmission of a subcarrier. Correspondingly, the optical receiver can be constructed simply and at low cost.

A second aspect is characterized in that in the first aspect, the double-modulating portion comprises a semiconductor laser diode for outputting the main carrier, and at least one external optical modulating portion for amplitude-modulating the main carrier inputted from the semiconductor laser diode by a subcarrier amplitude-modulated by an electrical signal to be transmitted which is inputted from outside using an external optical modulation.

According to the second aspect, the double-modulating portion is constituted by an existing semiconductor laser diode and an existing external optical modulating portion, so that the optical transmitter-receiver is constructed at low cost.

A third aspect is characterized in that in the second aspect, wherein the subcarrier amplitude-modulated by the electrical signal to be transmitted is a signal transmitted from outside, further comprising an antenna portion receiving the signal transmitted for supplying the signal to the double-modulating portion.

According to the third aspect, the optical transmitter-receiver can be easily connected to the wireless transmission system by comprising the antenna portion receiving the signal transmitted from outside.

A fourth aspect is characterized in that in the third aspect, the electrical signal to be transmitted is a multichannel signal frequency-multiplexed, and the electrical modulating portion amplitude-modulates the inputted subcarrier by the multichannel signal, to produce and output the modulated electrical signal.

According to the fourth aspect, the optical transmitter-receiver can optically transmit a lot of information.

A fifth aspect is characterized in that in the third aspect, the electrical signal to be transmitted is digital information, and the electrical modulating portion OOK (on-off keying)-modulates the subcarrier by the digital information.

According to the fifth aspect, the optical transmitter-receiver can transmit information high in quality.

A sixth aspect is directed to an optical transmitter-receiver in which an optical transmitter and an optical receiver are interconnected such that optical transmission is possible, comprising: a double-modulating portion, to which a subcarrier modulated by an electrical signal to be transmitted is inputted from outside, for double-modulating a main carrier, which is unmodulated light having a predetermined optical frequency, by the inputted subcarrier, to produce and output a double-modulated optical signal; an optical spectrum of the double-modulated optical signal inputted from the double-modulating portion including a component of the main carrier at the predetermined optical frequency and further including components of an upper sideband and a lower sideband at frequencies spaced by the frequency of the subcarrier apart from the predetermined optical frequency; an optical filter portion for selectively passing an optical signal including the component of either one of the upper sideband and the lower sideband in the double-modulated optical signal inputted from the double-modulating portion; and an optical branching portion for branching the optical signal inputted from the optical filter portion into a first optical signal and a second optical signal and outputting the first and second optical signals;

a first optical/electrical converting portion for optical/electrical-converting the first optical signal inputted from the optical branching portion, to obtain the electrical signal to be transmitted; a second optical/electrical converting portion for outputting as a detecting signal an electrical signal obtained by optical/electrical-converting the second optical signal inputted from the optical branching portion; and a wavelength control portion for detecting the average values of detected signals inputted from the second optical/electrical converting portion at predetermined time intervals, and controlling the wavelength of the double-modulated optical signal outputted from the double-modulating portion on the basis of the maximum value of the detected average values, the optical transmitter comprising at least the local oscillating portion and the double-modulating portion, the optical receiver comprising at least the first optical/electrical converting portion, and the optical filter portion being included in either one of the optical transmitter and the optical receiver.

According to the sixth aspect, as same as the first aspect, the optical transmitter-receiver can be constructed simply and at low cost, eliminating the necessity of an electrical component, which is high in cost and is difficult to process, corresponding to a subcarrier band which is a relatively high frequency. Further, the optical filter portion can output an optical signal possible a constantly precise demodulation for controlling a wavelength of the double-modulated optical.

A seventh aspect is directed to an optical transmitter-receiver in which an optical transmitter and first and second optical receivers are interconnected such that subcarrier optical transmission is possible, characterized in that the optical transmitter comprises: a local oscillating portion for outputting a subcarrier having a predetermined frequency; a double-modulating portion for double-modulating a main carrier, which is unmodulated light having a predetermined optical frequency, by an electrical signal to be transmitted, which is inputted from outside, and the subcarrier inputted from the local oscillating portion, to produce and output a double-modulated optical signal, a spectrum of the double-modulated optical signal outputted from the double-modulating portion including a component of the main carrier at the predetermined optical frequency and further including components of an upper sideband and a lower sideband at frequencies spaced by the frequency of the subcarrier apart from the predetermined optical frequency, and an optical portion for dividing the double-modulated optical signal inputted from the double-modulating portion into a first optical signal including the component of either one of the upper sideband and the lower sideband and a second optical signal including the component of the main carrier and the component of the other one of the upper sideband and the lower sideband, to output the first optical signal and the second optical signal, the first optical receiver optical/electrical-converts the first optical signal transmitted from the optical transmitter, to obtain the electrical signal to be transmitted, and the second optical receiver optical/electrical converts the second optical signal transmitted from the optical transmitter, to output the subcarrier that is modulated by the electrical signal to be transmitted.

The first optical signal includes the component of one of the sidebands included in the double-modulated optical signal obtained by the double modulation, and is optical/electrical-converted by the first optical/electrical converting portion, to be converted into an electrical signal to be transmitted. Further, the second optical signal includes the components of the other sideband and the main carrier in the double-modulated optical signal, and is optical/electrical-converted by the second optical/electrical converting portion, to be converted into a signal in which the subcarrier is modulated by the electrical signal to be transmitted. According to the seventh aspect, both the electrical signal to be transmitted and the signal in which the subcarrier is modulated by the electrical signal to be transmitted can be simultaneously obtained on the receiving side. Further, as apparent by referring to the foregoing, both the signals can be transmitted by a signal wave of unmodulated light, so that the optical transmitter-receiver can be constructed at low cast according to the seventh aspect without requiring a plurality of light sources as in a wavelength division multiplexing technique.

An eighth aspect is characterized in that in the seventh aspect, the double-modulating portion comprises: an electrical modulating portion for amplitude-modulating the subcarrier inputted from the local oscillating portion by the electrical signal to be transmitted, which is inputted from outside, to produce and output a modulated electrical signal; a light source for outputting the main carrier, which is unmodulated light having a predetermined optical frequency; and an external optical modulating portion for amplitude-modulating the main carrier inputted from the light source by the modulated electrical signal inputted from the electrical modulating portion, to produce the double-modulated optical signal.

According to the eighth aspect, the optical transmitter uses the same light source to simultaneously transmit the electrical signal to be transmitted and the signal in which the subcarrier is modulated by the electrical signal to be transmitted toward the receiving side. Consequently, the optical transmitter-receiver is constructed at low cost.

A ninth aspect is characterized in that in the eighth aspect, the electrical signal to be transmitted is digital information, and the electrical modulating portion OOK (on-off keying)-modulates the subcarrier by the digital information.

According to the ninth aspect, the optical transmitter-receiver can transmit information high in quality.

A tenth aspect is characterized in that in the seventh aspect, the double-modulating portion comprises: a light source for outputting the main carrier, which is unmodulated light having a predetermined optical frequency; a first external optical modulating portion for amplitude-modulating the main carrier inputted from the light source by the subcarrier inputted from the local oscillating portion, to produce and output a modulated optical signal; and a second external optical modulating portion for amplitude-modulating the modulated optical signal inputted from the first external optical modulating portion by the electrical signal to be transmitted, which is inputted from outside, to produce the double-modulated optical signal.

According to the tenth aspect, the optical transmitter uses the same light source to simultaneously transmit the electrical signal to be transmitted and the signal in which the subcarrier is modulated by the electrical signal to be transmitted toward the receiving side. Consequently, the optical transmitter-receiver is constructed at low cost.

An eleventh aspect is characterized in that in the seventh aspect, the double-modulating portion comprises: a light source for outputting the main carrier which is unmodulated light having a predetermined optical frequency; a first external optical modulating portion for amplitude-modulating the main carrier inputted from the light source by the electrical signal to be transmitted, which is inputted from outside, to produce and output a modulated optical signal; and a second external optical modulating portion for amplitude-modulating the modulated optical signal inputted from the first external optical modulating portion by the subcarrier inputted from the local oscillating portion, to produce the double-modulated optical signal.

According to the eleventh aspect, the optical transmitter uses the same light source to simultaneously transmit the electrical signal to be transmitted and the signal in which the subcarrier is modulated by the electrical signal to be transmitted toward the receiving side. Consequently, the optical transmitter-receiver is constructed at low cost.

A twelfth aspect is characterized in that in the seventh aspect, the optical filter portion comprises an optical circular portion for outputting the double-modulated optical signal inputted from the double-modulating portion as it is, and an optical fiber grating portion for reflecting the component of either one of the upper sideband and the lower sideband in the double-modulated optical signal inputted from the optical circulator portion, to produce the first optical signal and output the produced first optical signal to the optical circulator portion, and passing the component of the main carrier and the component of the other one of the upper sideband and the lower sideband, to produce and output the second optical signal to the second optical receiver, the optical circulator portion further outputting the first optical signal inputted from the optical fiber grating portion as it is to the first optical receiver.

In the twelfth aspect, the optical filter portion is constituted by the optical circulator and the optical fiber grating which are optical components, so that the optical transmitter-receiver is constructed simply and at low cost.

A thirteenth aspect is characterized in that in the seventh aspect, the second optical receiver comprises an antenna portion for radiating to a space the subcarrier that is modulated by the electrical signal to be transmitted which is obtained by the optical/electrical conversion.

The subcarrier modulated by the electrical signal to be transmitted is a signal suitable for wireless transmission. According to the thirteenth aspect, the second optical receiver comprises the antenna portion for radiating the subcarrier to a space, so that the optical transmitter-receiver is easily connected to a wireless transmission system.

A fourteenth aspect is characterized in that in the seventh aspect, the electrical signal to be transmitted is an electrical signal to be transmitted which is converted analog information into digital information.

According to the fourteenth aspect, the optical transmitter-receiver can transmit information high in quality.

A fifteenth aspect is characterized in that in the seventh aspect, the electrical signal to be transmitted is a carrier modulated by analog information and digital information, the frequency of the carrier is an intermediate frequency lower than that of the subcarrier outputted from the local oscillating portion.

When the electrical signal to be transmitted is the above-mentioned electrical signal, the carrier having the intermediate frequency modulated by the analog information or the like and the signal in which the subcarrier is modulated by the carrier having the intermediate frequency are obtained on the receiving side of the optical transmitter-receiver according to the fifteenth aspect. Consequently, the optical transmitter-receiver can perform optical transmission which does not depend on a modulation form.

A sixeenth aspect is characterized in that in the seventh aspect, the electrical signal to be transmitted is obtained by multiplexing a plurality of electrical signals that have the intermediate frequency and are modulated by analog information or digital information using a predetermined multiplexing technique, respectively.

A seventeenth aspect is characterized in that in the sixteenth aspect, the predetermined multiplexing technique is a frequency division multiplexing access, a time division multiplexing access or a code division multiplexing access.

According to the sixteenth and seventeenth aspects, the optical transmitter-receiver can multiplex a lot of information and optically transmit information obtained by the multiplexing.

An eighteenth aspect is directed to an optical transmitter-receiver in which an optical transmitter and first and second optical receivers are interconnected such that subcarrier optical information is possible, characterized in that the optical transmitter comprises: a local oscillating portion for outputting a subcarrier having a predetermined frequency; a double-modulating portion for double-modulating a main carrier, which is unmodulated light having a predetermined optical frequency, by an electrical signal to be transmitted, which is inputted from outside, and by the subcarrier inputted from the local oscillating portion, to produce and output a double-modulated optical signal; and an optical branching portion for branching the double-modulated optical signal inputted from the double-modulating portion and outputting double-modulated optical signals obtained by the branching, the first optical receiver comprises a low-pass filter portion for passing a component included in a low frequency band of an electrical signal obtained by optical/electrical-converting the double-modulated optical signal transmitted from the optical transmitter, to output the electrical signal to be transmitted, and the second optical receiver comprises a high-pass filter portion for passing a component included in a high frequency band of an electrical signal obtained by optical/electrical-converting the double-modulated optical signal transmitted from the optical transmitter, to output the subcarrier that is modulated by the electrical signal to be transmitted.

On the receiving side in the eighteenth aspect, as same as the seventh aspect, the low-pas filter portion and the high-pass filter portion respectively pass a low frequency band part and a high frequency band part of the electrical signal obtained by optical/electrical-converting the double-modulated optical signal. Therefore, signals obtained upon respectively modulating the subcarrier by an electrical signal to be transmitted, which is included in the relatively low frequency band, and an electrical signal to be transmitted, which is included in the relatively high frequency band, can be simultaneously obtained. Further, the optical transmitter-receiver can be constructed at low cost.

A nineteenth aspect is characterized in that in the eighteenth aspect, the double-modulating portion comprises: an electrical modulating portion for amplitude-modulating the subcarrier outputted from the local oscillating portion by the electrical signal to be transmitted, which is inputted from outside, to produce and output a modulated electrical signal; a light source for outputting the main carrier, which is unmodulated light having a predetermined optical frequency; and an external optical modulating portion for amplitude-modulating the main carrier outputted from the light source by the modulated electrical signal inputted from the electrical modulating portion, to produce the double-modulated optical signal.

According to the nineteenth aspect, the optical transmitter uses the same light source to simultaneously transmit the electrical signal to be transmitted and the signal in which the subcarrier is modulated by the electrical signal to be transmitted toward the receiving side. Consequently, the optical transmitter-receiver is constructed at low cost.

A twentieth aspect is characterized in that in the nineteenth aspect, the electrical signal to be transmitted is digital information, and the electrical modulating portion OOK (on-off keying)-modulates the subcarrier by the digital information.

According to the twentieth aspect, the optical transmitter-receiver can transmit information high in quality.

A twenty-first aspect is characterized in that in the eighteenth aspect, the double-modulating portion comprises: a light source for outputting the main carrier which is unmodulated light having a predetermined optical frequency; a first external optical modulating portion for amplitude-modulating the main carrier inputted from the light source by the subcarrier inputted from the local oscillating portion, to produce and output a modulated optical signal; and a second external optical modulating portion for amplitude-modulating the modulated optical signal inputted from the first external optical modulating portion by the electrical signal to be transmitted which is inputted from outside, to produce the double-modulated optical signal.

According to the twenty-first aspect, the optical transmitter uses the same light source to simultaneously transmit the electrical signal to be transmitted and the signal in which the subcarrier is modulated by the electrical signal to be transmitted toward the receiving side. Consequently, the optical transmitter-receiver is constructed at low cost. p A twenty-second aspect is characterized in that in the eighteenth aspect, the double-modulating portion comprises: a light source for outputting the main carrier, which is unmodulated light having a predetermined optical frequency; a first external optical modulating portion for amplitude-modulating the main carrier inputted from the light source by the electrical signal to be transmitted, which is inputted from outside, to produce and output a modulated optical signal; and a second external optical modulating portion for amplitude-modulating the modulated optical signal inputted from the first external optical modulating portion by the subcarrier inputted from the local oscillating portion, to produce the double-modulated optical signal.

According to the twenty-second aspect, the optical transmitter uses the same light source to simultaneously transmit the electrical signal to be transmitted and the signal in which the subcarrier is modulated by the electrical signal to be transmitted toward the receiving side. Consequently, the optical transmitter-receiver is constructed at low cost.

A twenty-third aspect is characterized in that in the eighteenth aspect, an antenna portion for radiating to a space is set in a back end against the high-pass filter portion. The antenna portion radiates the subcarrier that is modulated by the electrical signal to be transmitted, which is outputted from the high-pass filter portion.

According to the twenty-third aspect, the optical transmitter-receiver is simply connected to a wireless transmission system, as in the thirteenth aspect.

A twenty-fourth aspect, is characterized in that in the eighteenth aspect, the electrical signal to be transmitted is a carrier modulated by analog information or digital information, the frequency of the carrier is an intermediate frequency lower than that of the subcarrier outputted from the local oscillating portion.

According to the twenty-fourth aspect, when the electrical signal to be transmitted is the above-mentioned electrical signal, the carrier having the intermediate frequency modulated by the analog information or the like and the signal in which the subcarrier is modulated by the carrier having the intermediate frequency are obtained on the side of optical receiving. Consequently, the optical transmitter-receiver can perform optical transmission which does not depend on a modulation form.

A twenty-fifth aspect is characterized in that the eighteenth aspect, the double-modulating portion modulates the main carrier by the subcarrier inputted from the local oscillating portion using a single sideband amplitude modulation system.

In the twenty-fifth aspect, the double-modulated optical signal is not easily affected by wavelength dispersion in an optical fiber serving as an optical transmission line by applying a single sideband amplitude modulation system, so that the transmission distance increases.

A twenty-sixth aspect is directed to an optical transmitter-receiver in which an optical transmitter and an optical receiver are interconnected such that subcarrier optical transmission is possible, characterized in that the optical transmitter comprises: a local oscillating portion for outputting a subcarrier having a predetermined frequency; and a double-modulating portion for double-modulating a main carrier, which is unmodulated light having a predetermined optical frequency, by an electrical signal to be transmitted, which is inputted from outside, and by the subcarrier inputted from the local oscillating portion, to produce and output a double-modulated optical signal, and the optical receiver comprises an optical/electrical converting portion for optical/electrical-converting the double-modulated optical signal transmitted from the optical transmitter, to output an electrical signal; a distributing portion for distributing the electrical signal inputted from the optical/electrical converting portion into at least two electrical signals; a low-pass filter portion for passing a component included in a low frequency band of the electrical signal obtained by the distribution, to output the electrical signal to be transmitted; and a high-pass filter portion for passing a component included in a high frequency band of the electrical signal obtained by the distribution, to output the subcarrier that is modulated by the electrical signal to be transmitted.

On the receiving side in the twenty-sixth aspect, the low-pass filter portion and the high-pass filter portion respectively pass a low frequency band part and a high frequency band part of the electrical signal obtained by optical/electrical-converting the double-modulated optical signal, as in the seventh aspect. Therefore, signals in which a subcarrier is modulated by an electrical signal to be transmitted, which is included in the relatively low frequency band, and an electrical signal to be transmitted, which is included in the relatively high frequency band, can be simultaneously obtained. Further, the optical transmitter-receiver can be constructed at low cost.

A twenty-seventh aspect is characterized in that in the twenty-sixth aspect, the double-modulating portion comprises: an electrical modulating portion for amplitude-modulating the subcarrier inputted from the local oscillating portion by the electrical signal to be transmitted, which is inputted from outside, to produce and output a modulated electrical signal; a light source for outputting the main carrier, which is unmodulated light having a predetermined optical frequency; and an external optical modulating portion for amplitude-modulating the main carrier inputted from the light source by the modulated electrical signal inputted from the electrical modulating portion, to produce the double-modulated optical signal.

According to the twenty-seventh aspect, the optical transmitter uses the same light source to simultaneously transmit the electrical signal to be transmitted and the signal in which the subcarrier is modulated by the electrical signal to be transmitted toward the receiving side. Consequently, the optical transmitter-receiver is constructed at low cost.

A twenty-eighth aspect is characterized in that in the twenty-seventh aspect, the electrical signal to be transmitted is digital information, and the electrical modulating portion OOK (on-off keying)-modulates the subcarrier by the digital information.

According to the twenty-eighth aspect, the optical transmitter-receiver can transmit information high in quality.

A twenty-ninth aspect is characterized in that in the twenty-sixth aspect, the double-modulating portion comprises: a light source for outputting the main carrier, which is unmodulated light having a predetermined optical frequency; a first external optical modulating portion for amplitude-modulating the main carrier inputted from the light source by the subcarrier inputted from the local oscillating portion, to produce and output a modulated optical signal; and a second external optical modulating portion for amplitude-modulating the modulated optical signal inputted from the first external optical modulating portion by the electrical signal to be transmitted, which is inputted from outside, to produce the double-modulated optical signal.

According to the twenty-ninth aspect, the optical transmitter uses the same light source to simultaneously transmit the electrical signal to be transmitted and the signal in which the subcarrier is modulated by the electrical signal to be transmitted toward the receiving side. Consequently, the optical transmitter-receiver is constructed at low cost.

A thirtieth aspect is characterized in that in the twenty-sixth aspect, the double-modulating portion comprises: a light source for outputting the main carrier, which is unmodulated light having a predetermined optical frequency; a first external optical modulating portion for amplitude-modulating the main carrier inputted from the light source by the electrical signal to be transmitted, which is inputted from outside, to produce and output a modulated optical signal; and a second external optical modulating portion for amplitude-modulating the modulated optical signal inputted from the first external optical modulating portion by the subcarrier inputted from the local oscillating portion, to produce the double-modulated optical signal.

According to the thirtieth aspect, the optical transmitter uses the same light source to simultaneously transmit the electrical signal to be transmitted and the signal in which the subcarrier is modulated by the electrical signal to be transmitted toward the receiving side. Consequently, the optical transmitter-receiver is constructed at low cost.

A thirty-first aspect is characterized in that in the twenty-sixth aspect, an antenna portion for radiating to a space is set in a back end against the high-pass filter portion. The antenna portion radiates the subcarrier that is modulated by the electrical signal to be transmitted, which is outputted from the high-pass filter portion.

According to the thirty-first aspect, the optical transmitter-receiver is simply connected to a wireless transmission system, as in the thirteenth aspect.

A thirty-second aspect is characterized in that in the twenty-sixth aspect, the electrical signal to be transmitted is a carrier modulated by analog information or digital information, the frequency of the carrier is an intermediate frequency lower than that of the subcarrier outputted from the local oscillating portion.

According to the thirty-second aspect, the optical transmitter-receiver can perform optical transmission which does not depend on a modulation form, as in the fifteenth aspect.

A thirty-third aspect is characterized in that in the twenty-sixth aspect, the double-modulating portion modulates the main carrier by the subcarrier inputted from the local oscillating portion using a single sideband amplitude modulation system.

In the thirty-third aspect, the double-modulated optical signal is not easily affected by wavelength dispersion in an optical fiber serving as an optical transmission line, so that the transmission distance increases, as in the twenty-fifth aspect.

A thirty-fourth aspect is directed to an optical transmitter-receiver in which an optical transmitter and first and second optical receivers are interconnected such that subcarrier optical transmission is possible, characterized in that the optical transmitter comprises: a local oscillating portion for outputting a subcarrier having a predetermined frequency; a mode locked light source which is mode-locked on the basis of the subcarrier inputted from the local oscillating portion and oscillating with spacing between optical frequencies related to the subcarrier, to produce and output a mode-locked optical signal; an external optical modulating portion for amplitude-modulating the mode-locked optical signal inputted from the mode locked light source by an electrical signal to be transmitted, which is inputted from outside, to produce and output a double-modulated optical signal; and an optical branching portion for branching the double-modulated optical signal inputted from the external optical modulating portion and outputting double-modulated optical signals obtained by the branching, the first optical receiver comprises a low-pass filter portion for passing a component included in a low frequency band of an electrical signal obtained by optical/electrical-converting the double-modulated optical signal transmitted from the optical transmitter, to output the electrical signal to be transmitted, and the second optical receiver comprises a high-pass filter portion for passing a component included in a high frequency band of an electrical signal obtained by optical/electrical-converting the double-modulated optical signal transmitted from the optical transmitter, to output the subcarrier that is modulated by the electrical signal to be transmitted.

On the receiving side in the thirty-fourth aspect, the low-pass filter portion and the high-pass filter portion respectively pass a low frequency band part and a high frequency band part of the electrical signal obtained by optical/electrical-converting the double-modulated optical signal, as in the seventh aspect. Therefore, signals in which the subcarrier is modulated by an electrical signal to be transmitted, which is included in the relatively low frequency band, and an electrical signal to be transmitted, which is included in the relatively high frequency band, can be simultaneously obtained. Further, the optical transmitter-receiver can be constructed at low cost.

A thirty-fifth aspect is characterized in that in the thirty-fourth aspect, an antenna portion for radiating to a space is set in a back end against the high-pass filter portion. The antenna portion radiates the subcarrier that is modulated by the electrical signal to be transmitted, which is outputted from the high-pass filter portion.

According to the thirty-fifth aspect, the optical transmitter-receiver is simply connected to a wireless transmission system, as in the thirteenth aspect.

A thirty-sixth aspect is characterized in that in the thirty-fourth aspect, the electrical signal to be transmitted is a carrier modulated by analog information or digital information, the frequency of the carrier is an intermediate frequency lower than that of the subcarrier outputted from the local oscillating portion.

According to the thirty-sixth aspect, the optical transmitter-receiver can perform optical transmission which does not depend on a modulation form, as in the fifteenth aspect.

A thirty-seventh aspect is directed to an optical transmitter-receiver in which an optical transmitter and an optical receiver are interconnected such that subcarrier optical transmission is possible, characterized in that the optical transmitter comprises: a local oscillating portion for outputting a subcarrier having a predetermined frequency; a mode locked light source which is mode-locked on the basis of a subcarrier inputted from the local oscillating portion and oscillating with spacing between optical frequencies related to the subcarrier, to produce and output a mode-locked optical signal, and an external optical modulating portion for amplitude-modulating the mode-locked optical signal inputted from the mode locked light source by the electrical signal to be transmitted, which is inputted from outside, to produce and output a double-modulated optical signal, and the optical receiver comprises: an optical/electrical converting portion for optical/electrical-converting the double-modulated optical signal transmitted from the optical transmitter, to output an electrical signal; a distributing portion for distributing the electrical signal inputted from the optical/electrical converting portion into at least two electrical signals; a low-pass filter portion for passing a component included in a low frequency band of the electrical signal obtained by the distribution, to output the electrical signal to be transmitted, and a high-pass filter portion for passing a component included in a high frequency band of the electrical signal obtained by the distribution, to output the subcarrier that is modulated by the electrical signal to be transmitted.

On the receiving side in the thirty-seventh aspect, the low-pass filter portion and the high-pass filter portion respectively pass a low frequency band part and a high frequency band part of the electrical signal obtained by optical/electrical-converting the double-modulated optical signal, as in the seventh aspect. Therefore, signals obtained by modulating the subcarrier by an electrical signal to be transmitted, which is included in the relatively low frequency band, and an electrical signal to be transmitted, which is included in the relatively high frequency band, can be simultaneously obtained. Further, the optical transmitter-receiver can be constructed at low cost.

A thirty-eighth aspect is characterized in that in the thirty-seventh aspect, an antenna portion for radiating to a space is set in a back end against the high-pass filter portion. The antenna portion radiates the subcarrier that is modulated by the electrical signal to be transmitted which is outputted from the high-pass filter portion.

According to the thirty-eighth aspect, the optical transmitter-receiver is simply connected to a wireless transmission system, as in the thirteenth aspect.

A thirty-ninth aspect is characterized in that in the thirty-seventh aspect, the electrical signal to be transmitted is a carrier modulated by analog information or digital information, the frequency of the carrier is an intermediate frequency lower than that of the subcarrier outputted from the local oscillating portion.

According to the thirty-ninth aspect, the optical transmitter-receiver can perform optical transmission which does not depend on a modulation form, as in the fifteenth aspect.

A fortieth aspect is directed to an optical transmitter-receiver in which an optical transmitter and first and second optical receivers are interconnected such that optical transmission is possible, wherein the optical transmitter comprises: a first light source for outputting first unmodulated light having a first optical frequency; an external optical modulating portion for amplitude-modulating the first unmodulated light inputted from the first light source by an electrical signal to be transmitted, which is inputted from outside, to produce and output a modulated optical signal; a second light source for outputting second unmodulated light having a second optical frequency, which differs from the first optical frequency by a predetermined optical frequency; an optical multiplexing portion for multiplexing the modulated optical signal inputted from the external optical modulating portion and the second unmodulated light inputted from the second light source such that polarization of the modulated optical signal and the second unmodulated light coincide with each other, to produce and output an optical signal; and an optical branching portion for branching the optical signal inputted from the optical multiplexing portion and outputting optical signals obtained by the branching, the first optical receiver comprises a low-pass filter portion for passing a component included in a low frequency band of an electrical signal obtained by optical/electrical-converting the optical signal transmitted from the optical transmitter, to output the electrical signal to be transmitted, and the second optical receiver comprises a high-pass filter portion for passing a component included in a high frequency band of an electrical signal obtained by optical/electrical converting the optical signal transmitted from the optical transmitter, to output the subcarrier that is modulated by the electrical signal to be transmitted.

According to the fortieth aspect, the first unmodulated light is amplitude-modulated by the electrical signal to be transmitted, to produce the modulated optical signal. The modulated optical signal and the second unmodulated light are multiplexed, to produce the optical signal. Although optical/electrical conversion must be made twice in the seventh aspect, for example, the optical transmitter in the fortieth aspect performs optical/electrical conversion only once. By thus reducing the number of times of optical/electrical conversion, low-loss optical transmission can be realized. Further, in the optical transmitter in the fortieth aspect, no electrical component for amplitude-modulating the subcarrier by the electrical signal to be transmitted is required. That is, according to the fortieth aspect, the necessity of an electrical component, which is high in cost and is difficult to process, corresponding to a subcarrier band which is a relatively high frequency is eliminated. Correspondingly, the optical receiver can be constructed simply and at low cost.

A forty-first aspect is characterized in that in the fortieth aspect, an antenna portion for radiating to a space is set in a back end against the high-pass filter portion. The antenna portion radiates the subcarrier that is modulated by the electrical signal to be transmitted, which is outputted from the high-pass filter portion.

According to the forty-first aspect, the optical transmitter-receiver is simply connected to a wireless transmission system, as in the thirteenth aspect.

A forty-second aspect is characterized in that in the fortieth aspect, the electrical signal to be transmitted is a carrier modulated by analog information or digital information, the frequency of the carrier is an intermediate frequency lower than that of the subcarrier outputted from the local oscillating portion.

According to the forty-second aspect, the optical transmitter-receiver can perform optical transmission which does not depend on a modulation form, as in the fifteenth aspect.

A forty-third aspect is directed to an optical transmitter-receiver in which an optical transmitter and an optical receiver are interconnected such that optical transmission is possible, wherein the optical transmitter comprises: a first light source for outputting first unmodulated light having a first optical frequency, an external optical modulating portion for amplitude-modulating the first unmodulated light inputted from the first light source by an electrical signal to be transmitted, which is inputted from outside, to produce and output a modulated optical signal; a second light source for outputting second unmodulated light having a second optical frequency, which differs from the first optical frequency by a predetermined optical frequency; an optical multiplexing portion for multiplexing the modulated optical signal inputted from the external optical modulating portion and the second unmodulated light inputted from the second light source such that polarization of the modulated optical signal and the second unmodulated light coincide with each other, to produce and output an optical signal; and an optical branching portion for branching the optical signal inputted from the optical multiplexing portion and outputting optical signals branched by the branching portion, and the optical receiver comprises: an optical/electrical converting portion for optical/electrical-converting the optical signal transmitted from the optical transmitter, to output an electrical signal; a distributing portion for distributing the electrical signal inputted from the optical/electrical converting portion into at least two electrical signals; a low-pass filter portion for passing a component included in a low frequency band of the electrical signal obtained by the distribution, to output the electrical signal to be transmitted; and a high-pass filter portion for passing a component included in a high frequency band of the electrical signal obtained by the distribution, to output the subcarrier that is modulated by the electrical signal to be transmitted.

According to the forty-third aspect, it is possible to realize low-loss optical transmission as well as to construct the optical transmitter-receiver simply and at low cost.

A forty-fourth aspect is characterized in that in the forty-third aspect, an antenna portion for radiating to a space is set in a back end against the high-pass filter portion. The antenna portion radiates the subcarrier that is modulated by the electrical signal to be transmitted, which is outputted from the high-pass filter portion.

According to the forty-fourth aspect, the optical transmitter-receiver is simply connected to a wireless transmission system, as in the thirteenth aspect.

A forty-fifth aspect is characterized in that in the forty-third aspect, the electrical signal to be transmitted is a carrier modulated by analog information or digital information, the frequency of the carrier is an intermediate frequency lower than that of the subcarrier outputted from the local oscillating portion.

According to the forty-fifth aspect, the optical transmitter-receiver can perform optical transmission which does not depend on a modulation form, as in the fifteenth aspect.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
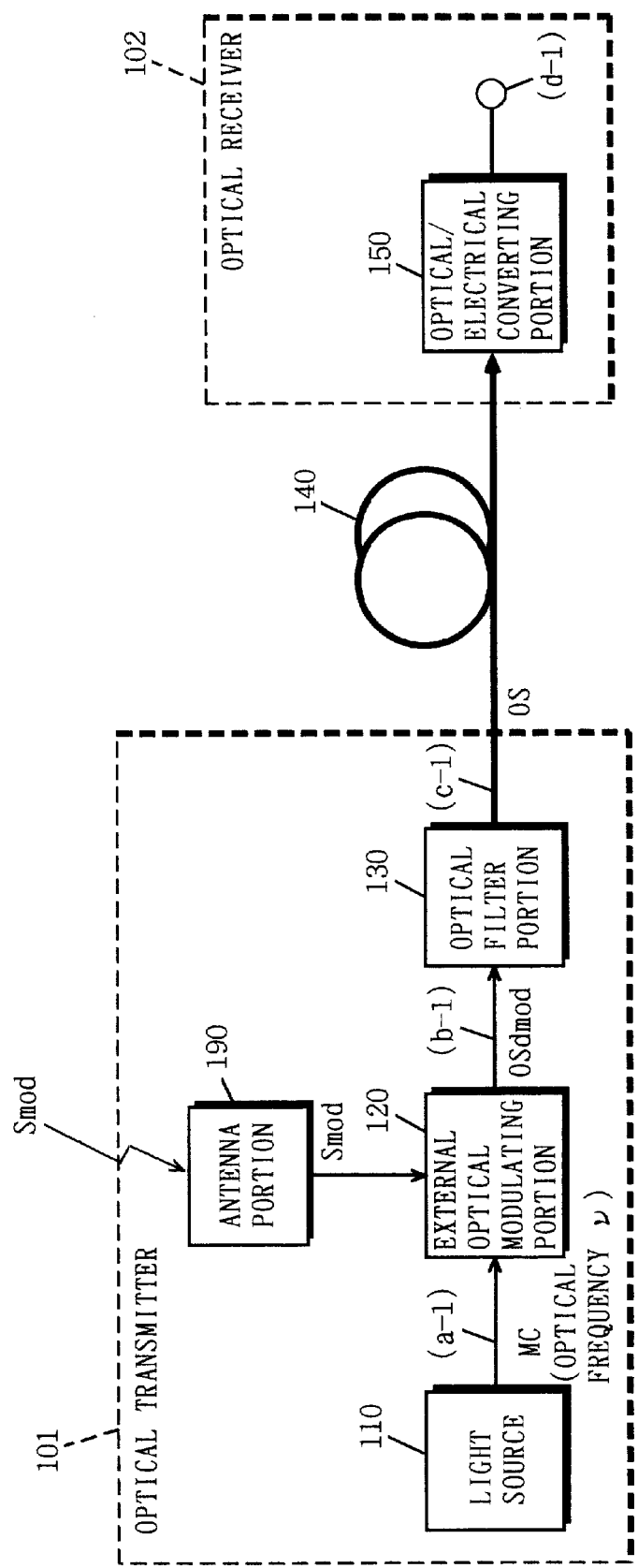
FIG. 1 is a block diagram showing the structure of an optical transmitter-receiver according to a first embodiment of the present invention.

FIG. 1 is a block diagram showing the structure of an optical transmitter-receiver according to a first embodiment of the present invention. In the optical transmitter-receiver shown in FIG. 1, an optical transmitter 101 and an optical receiver 102 are interconnected through an optical fiber 140 such that optical transmission is possible. The optical transmitter 101 comprises a light source 110, an external optical modulating portion 120, an optical filter portion 130, and an antenna portion 190, and the optical receiver 102 comprises an optical/electrical converting portion 150.

Figure 2:
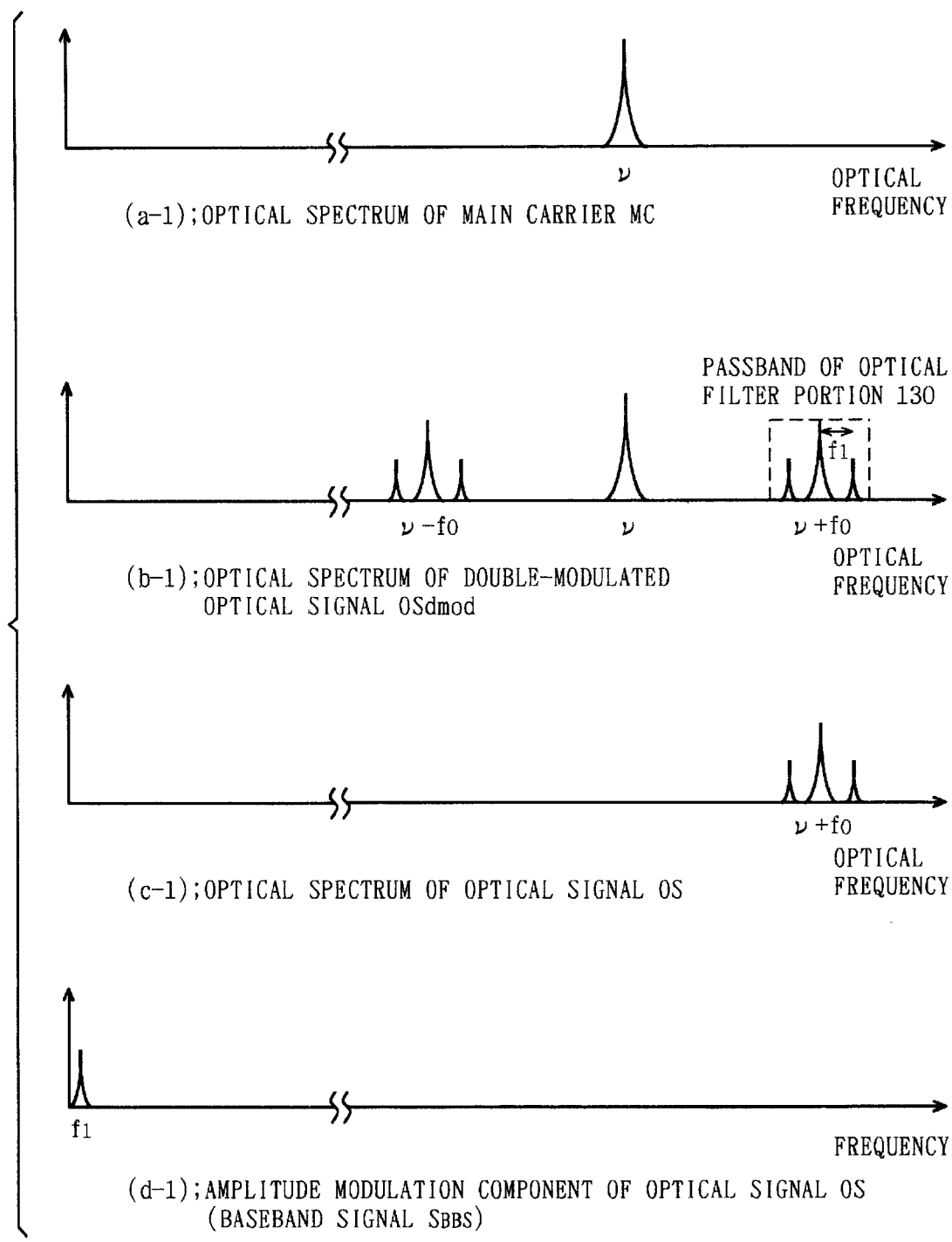
FIGS. 2(*a*-1) to (*d*-1) schematically illustrate spectrums of signals in principal parts (*a*-1) to (*d*-1) of the optical transmitter-receiver shown in FIG. 1.

FIGS. 2(*a*-1) to (*d*-1) schematically illustrate spectrums of signals in principal parts (*a*-1) to (*d*-1) of the optical transmitter-receiver shown in FIG. 1.

The operations of the optical transmitter-receiver shown in FIG. 1 will be described on the basis of FIGS. 1 and 2. In the optical transmitter 101, a signal amplitude-modulated an electrical subcarrier SC having a predetermined frequency $f_0$ by a baseband signal $S_{BB}$ to be transmitted having the frequency $f_1$ (hereinafter referred to as a modulated electrical signal $S_{mod}$) is transmitted from the outside. The antenna portion 190 receives the modulated electrical signal $S_{mod}$ and outputs it to the external optical modulating portion 120. It is assumed that a current waveform of the baseband signal $S_{BB}$ is I(t) and the amplitude modulation is performed at the degree of modulation $m_d$. The voltage waveform $V_d(t)$ of the modulated electrical signal $S_{mod}$ is expressed by the following equation (1):

$$V_d(t) = (1 + M_{df}(t)) \cos(\omega_0 t) \quad (1)$$

where $\omega_0 = 2\pi f_0$. When $(1 + m_{df}(t))$ is replaced with D(t), the foregoing equation (1) is expressed by the following equation (2):

$$V_d(t) \cos(\omega_{ot}) \quad (2)$$

The light source 110 is typically constituted by a semiconductor laser diode, which oscillates unmodulated light having a predetermined optical frequency v as shown in FIG. 2(*a*-1), and outputs the unmodulated light as a main carrier MC. The external optical modulating portion 120 has a Mach-Zehnder type structure, for example, and amplitude-modulates the light intensity of the main carrier MC inputted from the light source 110 by the modulated electrical signal $S_{mod}$ inputted from the antenna portion 190, to produce an optical signal double-modulated (hereinafter referred to as a double-modulated optical signal $OS_{dmod}$). More specifically, the Mach-Zehnder type external optical modulating portion 120 first branches the inputted main carrier MC into two main carriers. One of the branched main carriers MC is optical-phase-modulated by the inputted modulated electrical signal $S_{mod}$. The modulated main carrier MC is multiplexed with the other branched main carrier MC, thereby producing the above-mentioned double-modulated optical signal $OS_{dmod}$. The change in the amplitude of the double-modulated optical signal $OS_{dmod}$ uniquely corresponds to the change in the amplitude of the modulated electrical signal $S_{mod}$. The optical spectrum of the double-modulated optical signal $OS_{dmod}$ has a component of the main carrier MC at a center optical frequency v, and further has components of sidebands (an upper sideband and a lower sidewall) at frequencies spaced an integral multiple of the optical frequency $f_0$ apart from the optical frequency v (only $\pm f_0$ are illustrated). The occupied frequency bands of components of both the sidebands depend on the above-mentioned frequency $f_1$.

The field strength waveform E(t) of the double-modulated optical signal $OS_{dmod}$ is then expressed by an equation. It is assumed that the minimum value of a difference between input voltages in cases where the amplitude of the double-modulated optical signal $OS_{dmod}$ outputted from the external optical modulating portion 120 reaches zero and the maximum is $V\pi$. Further, it is assumed that a phase difference between the main carrier MC to be multiplexed in the external optical modulating portion 120 and the phase-modulated main carrier MC is set to $\pi/2$. By following the assumption, the double-modulated optical signal $OS_{dmod}$ is expressed by the following equation (3):

$$E(t) = \frac{E}{2}\{\cos(2\pi vt) + \cos(2\pi vt)\cos(\delta_1) - \sin(2\pi vt)\sin(\delta_1)\} \quad (3)$$

$$= \frac{E}{2}\{\cos(2\pi vt) \cdot \cos(kD(t)\cos(\omega_0 t))\sin(2\pi vt) -$$

$$\sin(kD(t)\cos(\omega_0 t))\cos(2\pi vt)\}$$

where $k=\pi/2V_\pi$, and $\delta_1$ is expressed by the following equation (4):

$$\delta_1 = \frac{\pi}{2}D(t)\frac{\cos(\omega_0 t)}{V\pi} + \frac{\pi}{2} \quad (4)$$

For example, when it is assumed that the baseband signal $S_{BB}$ is a sine wave, and its current waveform is expressed by $I(t)=\cos(\omega_1 t)$ ($\omega_1 = 2\pi f_1$), $\delta_1$ is expressed by the following equation (5), and the foregoing equation (3) can be expanded as in the following equation (6) if the following equation (5) is used:

$$\delta_1 = k(1 + m_d\cos(\omega_1 t))\cos(\omega_0 t) + \frac{\pi}{2} \quad (5)$$

$$E(t) = \frac{E}{2}\cos(2\pi vt) - \quad (6)$$

$$\frac{E}{2}\cos(k(1+m\cos(\omega_1 t))\cos(\omega_0 t))\cos(2\pi vt) -$$

$$\frac{E}{2}\sin(k(1+m\cos(\omega_1 t))\cos(\omega_0 t))\cos(2\pi vt)$$

In the foregoing equation (6), the field strength waveform $E(t)$ of the double-modulated optical signal $OS_{dmod}$ is finally expressed by the following equation (7), considering the optical frequency $v$ and linear terms of $v$, $f_1$, and $f_0$:

$$E(t) = \frac{E}{2}\cos(2\pi vt)\Big\{1 + 2J_1(k)J_0^2\Big(\frac{km_d}{2}\Big)\cos(\omega_0 t) - \quad (7)$$

$$2J_0(k)J_0\Big(\frac{km_d}{2}\Big)J_1\Big(\frac{km_d}{2}\Big)(\cos(\omega_0 + \omega_1)t +$$

$$\cos(\omega_0 - \omega_1)t)\}$$

where $J_0$ is a zero-order Bessel function, and $J_1$ is a linear Bessel function.

The double-modulated optical signal $OS_{dmod}$ as described above is inputted to the optical filter portion 130. The passband of the optical filter portion 130 is so set that only the component of the upper sideband or the lower sideband out of the components of the double-modulated optical signal $OS_{dmod}$ shown in FIG. 2(*b*-1) can be extracted. For example, when the passband of the optical filter portion 130 is set to the vicinity of an optical frequency $v+f_0$ (see a portion enclosed by a dotted line in FIG. 2(*b*-1), only the component of the upper sideband passes through the optical filter portion 130 as an optical signal OS. The optical spectrum of the optical signal OS has only the same component as that of the upper sideband, and is included in an optical frequency band in the vicinity of the optical frequency $v+f_0$, as shown in FIG. 2(*c*-1).

The field strength waveform $E_1(t)$ of the optical signal OS is then expressed by the following strength (8). When the following equation (8) is arranged, the following equation (9) is obtained:

$$E_f(t) = \frac{E}{2}J_0\Big(\frac{km_d}{2}\Big)\Big\{J_1(k)J_0\Big(\frac{km_d}{2}\Big)\cos(\omega + \omega_0)t - \quad (8)$$

$$J_0(k)J_1\Big(\frac{km_d}{2}\Big)(\cos(\omega + \omega_0 + \omega_1)t +$$

$$\cos(\omega + \omega_0 + \omega_1)t)\}$$

$$E_t(t) = K \cos(\omega + \omega_0)t(1 - m'\cos\omega_1 t) \quad (9)$$

In the foregoing equations (8) and (9), $\omega = 2\pi v$. In the foregoing equation (9), m' is expressed by the following equation (10), and K is expressed by the following equation (11):

$$m' = \frac{J_0(k)J_1\Big(\frac{km_d}{2}\Big)}{J_1(k)J_0\Big(\frac{km_d}{2}\Big)} \quad (10)$$

$$K = \frac{E}{2}J_0\Big(\frac{km_d}{2}\Big)J_1(k)J_0\Big(\frac{km_d}{2}\Big) \quad (11)$$

The optical signal OS described with reference to the foregoing equations and FIG. 2(*c*-1) is outputted to the optical fiber 140 from the optical filter portion 130, is transmitted through the optical fiber 140, and is incident on the optical/electrical converting portion 150 in the optical receiver 102. Consequently, the optical signal OS is transmitted to a remote location.

The optical/electrical converting portion 150 optical/electrical converts the incident optical signal OS and outputs an electrical signal. It is found by referring to FIG. 2(*c*-1) that the optical signal OS is equivalent to one obtained upon amplitude-modulating a carrier having the optical frequency $v+f_0$ by the baseband signal $S_{BB}$ (=cos $2\pi f_1 t$) which is information to be transmitted. Consequently, the current waveform $I_{pd}(t)$ of the electrical signal outputted from the optical/electrical converting portion 150 is expressed by the following equation (12):

$$I_{pd}(t) = \frac{\eta}{2}K^2(1 - m'\cos\omega_1 t)^2 \quad (12)$$

$$= I_{pd}(1 - 2m'\cos\omega_1 t + m'^2\cos^2\omega_1 t)$$

where $\eta$ is the conversion efficiency of the optical/electrical converting portion 150, and $I_{pd}$ is a DC (direct current) component. As can be seen by referring to the foregoing equation (12), if only a component of $\omega_1$ (a component having a frequency $f_1$) is extracted from the electrical signal outputted from the optical/electrical converting portion 150, an amplitude modulation component of the optical signal OS, that is, the current waveform $I(t)$ of the baseband signal $S_{BB}$ is directly obtained, as shown in FIG. 2(*d*-1). It is more easily feasible to extract only the component of $\omega_1$ by connecting a band-pass filter to a back end against the optical/electrical converting portion 150. The optical/electrical converting portion 150 may only have frequency characteristics for a band of the frequency $f_1$, and does not require wideband characteristics as in conventional subcarrier optical transmission.

As described in the foregoing, it is assumed from the viewpoint of simplification of illustration that the baseband signal $S_{BB}$ is expressed by $I(t)=\cos(\omega_1 t)$, that is, it is a one-channel signal. Even if the baseband signal $S_{BB}$ is a multichannel signal, that is, it is expressed by I(t)=cos ($\omega_1$t)+cos ($\omega_2$t)+ . . . , it can be demodulated in the optical transmitter-receiver, similarly to the one-channel signal.

When the baseband signal $S_{BB}$ is particularly digital information, the component of the subcarrier SC of the modulated electrical signal $S_{mod}$ is performed digital amplitude modulation called ASK (Amplitude Shift Keying) or on-off keying. Consequently, the optical transmitter-receiver can optically transmit information high in quality.

When the subcarrier SC is double sideband modulated by the baseband signal $S_{BB}$(=I(t)) which is digital information, the voltage waveform $V_d$(t) of the modulated electrical signal $S_{mod}$ is expressed by the following equation (13):

$$V_d(t)=D(t) \cos(\omega_0 t)=m_d I(t) \cos(\omega_0 t) \quad (13)$$

At this time, the field strength waveform E(t) of the double-modulated optical signal $OS_{dmod}$ outputted from the external optical modulating portion 120 is found by the following equation (14):

$$E(t) = \frac{E}{2}(\cos(\omega t) - J_0(k)\sin(\omega t)) + \frac{E}{2}J_1(k)\cos(\omega + \omega_0)t + \frac{E}{2}J_1(k)\cos(\omega - \omega_0)t \quad (14)$$

The double-modulated optical signal $OS_{dmod}$ expressed by the foregoing equation (14) is optically transmitted through the optical fiber 140 as an optical signal OS after passing through the optical filter portion 130, and is then incident on the optical/electrical converting portion 150. The optical/electrical converting portion 150 optical/electrical converts the incident optical signal OS and outputs an electrical signal. The current waveform $I_{pd}$(t) of the electrical signal is expressed by the following equation (15):

$$I_{pd}(t) = \frac{\eta}{2}\left(\frac{E}{2}J_1(km_d(t))\right)^2 \approx \frac{\eta}{2}\left(\frac{E}{2}\frac{km_d I(t)}{2}\right)^2 \quad (15)$$

In the foregoing equation (15), $km_d I(t) \ll 1$.

When the double sideband modulation is thus performed, the output current waveform of the optical/electrical converting portion 150 is obtained as it is as a demodulated signal, as also apparent from the foregoing equation (15). It is found from the foregoing equation (15) that I(t) varies linearly, while $I_{pd}$(t) varies in the second order. If M-ASK (a multivalued ASK modulation system) is employed, therefore, spacing between thresholds of $I_{pd}$(t) is twice in decibel spacing between thresholds of I(t). Therefore, it is found that the optical signal OS is resistant to noise which may occur on an optical transmission line (an optical fiber).

In the foregoing, it is assumed that a phase difference between the main carrier MC to be multiplexed in the external optical modulating portion 120 and the phase-modulated main carrier MC is set to π/2, the same effect can be also obtained in the case of setting the phase different to π/2. Furthermore, the same effect can be also obtained in the case of using other external optical modulators such as an electroabsorption modulator in place of Mach-Zender type external optical modulator.

As described in the foregoing, in the optical transmitter-receiver, the electrical signal having a high frequency such as a millimeter-wave band is optically transmitted by optical signal processing, and the optical signal is further optical-signal-processed, thereby eliminating the necessity of a high-frequency electrical component (a millimeter-wave band down-converter or demodulator) which was required in a conventional optical transmitter-receiver as well as completely eliminating the necessity of a high-frequency component which is difficult to work, for example, a waveguide or a semirigid cable. Consequently, it is possible to significantly reduce the scale of the optical transmitter-receiver.

Since the main carrier is external-optical-modulator by the electrical signal having a high frequency such as a millimeter-wave band, spacing between optical frequencies of the component of the main carrier and the component of the sideband is wide (corresponding to the millimeter-wave band) in the optical spectrum shown in FIG. 2(*b*-1). Consequently, the optical filter 130 can accurately extract only the component of the sideband by the current technique.

In the first embodiment, the external optical modulating portion 120 optically modulates the main carrier MC by the modulated electrical signal $S_{mod}$ having the millimeter-wave band in order to produce a significant technical effect. Even if the external optical modulating portion 120 performs optical modulation by the modulated electrical signal $S_{mod}$ having the other frequency band, however, the optical receiver 102 can demodulate the baseband signal $S_{BB}$ without requiring an electrical component (a down-converter or a demodulator). That is, the optical transmitter-receiver according to the first embodiment is not limited to the millimeter-wave band. For example, it is applicable to a wider frequency band.

The optical transmitter-receiver according to the first embodiment does not easily perform direct optical modulation by the modulated electrical signal $S_{mod}$ having a millimeter-wave band if consideration is given to the frequency response characteristics of the light source 110. Therefore, an external optical modulation system has been employed. If the modulated electrical signal $S_{mod}$ is approximately not more than a microwave band, it is also possible to directly drive the light source 110 by the modulated electrical signal $S_{mod}$, and directly modulate the intensity of output light of the light source 110 irrespective of the frequency response characteristics. That is, the optical transmitter-receiver can also employ a direct optical modulation system.

In the optical transmitter-receiver according to the first embodiment, the optical filter portion 130 in the optical transmitter 101 extracts only the optical signal OS from the double-modulated optical signal $OS_{dmod}$ and outputs the optical signal OS to the optical fiber 140. However, the optical filter portion 130 may be provided in the optical receiver 102. In this case, the optical transmitter 101 directly outputs to the optical fiber 140 the double-modulated optical signal $OS_{dmod}$ produced by the external optical modulating portion 120. The optical receiver 102 extracts only the optical signal OS from the double-modulated optical signal $OS_{dmod}$ incident from the optical fiber 140 using the optical filter portion 130 set at a front end, and then optical/electrical converts the extracted optical signal OS using the optical/electrical converting portion 150 set at a back end.

Second Embodiment

Figure 3:
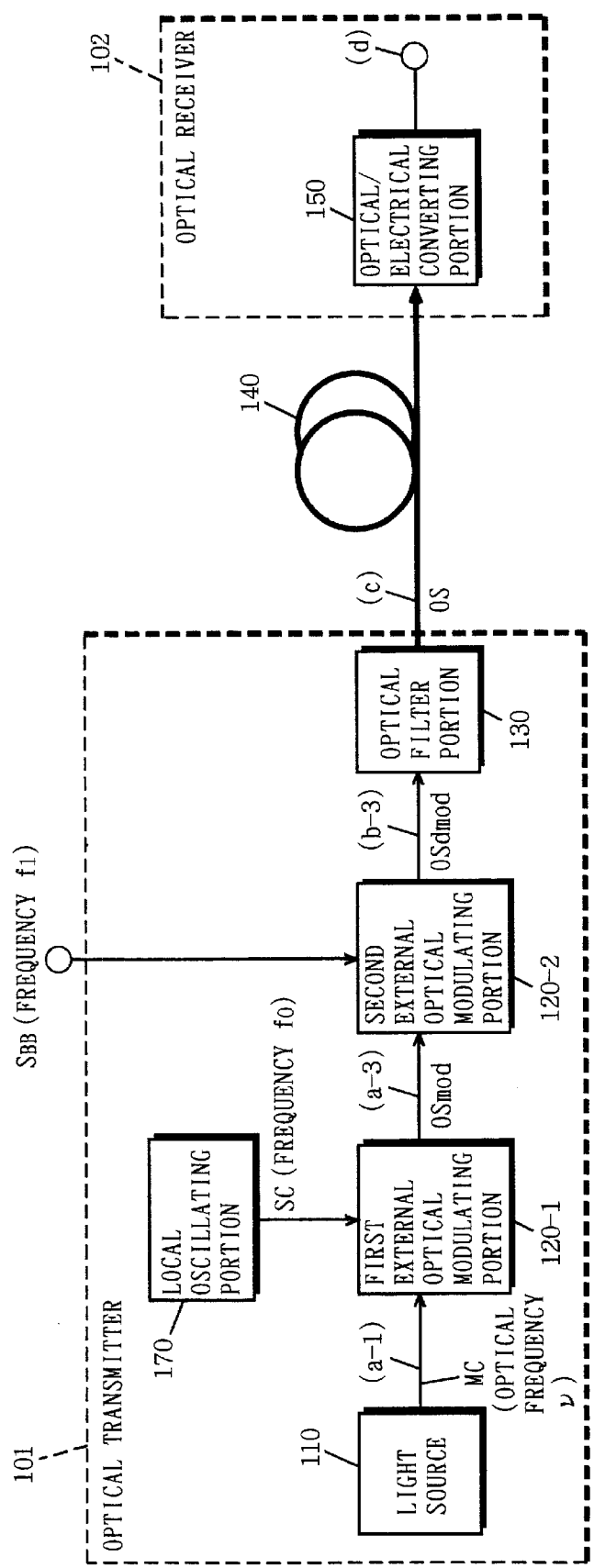
FIG. 3 is a block diagram showing the structure of an optical transmitter-receiver according to a second embodiment of the present invention.

FIG. 3 is a block diagram showing the structure of an optical transmitter-receiver according to a second embodiment of the present invention. In the optical transmitter-receiver shown in FIG. 3, an optical transmitter 101 and an optical receiver 102 are interconnected through an optical fiber 140 such that optical transmission is possible. The optical transmitter 101 comprises a light source 110, first and second external optical modulating portions 120-1 and 120-2, an optical filter portion 130, and a local oscillating portion 170, and the optical receiver 102 comprises an optical/electrical converting portion 150.

Figure 4:
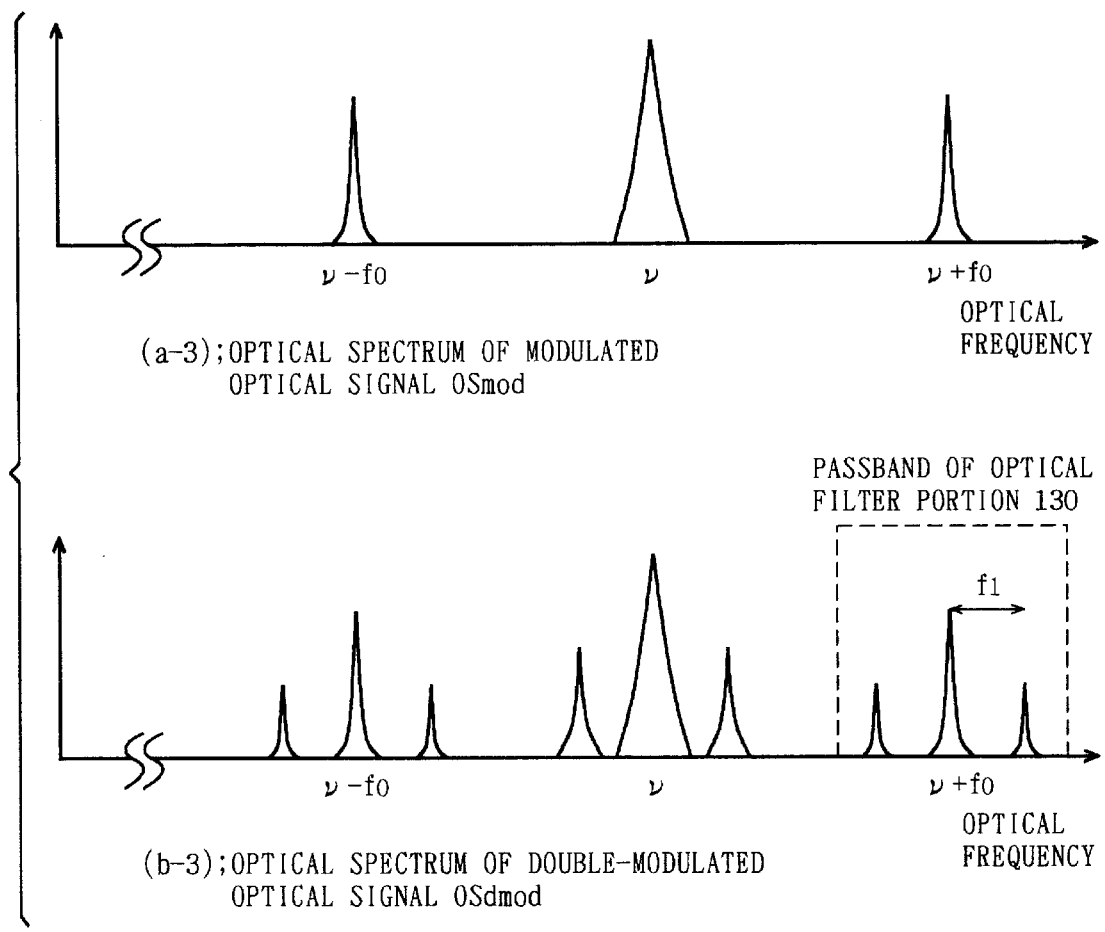
FIGS. 4(*a*-3) to (*b*-3) schematically illustrate spectrums of signals in principal parts (*a*-3) to (*b*-3) of the optical transmitter-receiver shown in FIG. 3.

FIGS. 4(a-3) to (b-3) schematically illustrate spectrums of signals in principal parts (a-3) to (b-3) of the optical transmitter-receiver shown in FIG. 3.

The operations of the optical transmitter-receiver shown in FIG. 3 will be described on the basis of FIGS. 3, 4 and so on. In the optical transmitter 101, the light source 110 is typically constructed by a semiconductor laser diode, which oscillates unmodulated light having a predetermined optical frequency ν as shown in FIG. 2 (a-1), and outputs the unmodulated light as a main carrier MC to the first external optical modulating portion 120-1. The local oscillating portion 170 outputs an electrical subcarrier SC having a predetermined frequency $f_0$ which is a millimeter-wave band to the first external optical modulating portion 120-1. The first external optical modulating portion 120-1 has a Mach-Zehnder type structure, for example (see the first embodiment), and amplitude-modulates the inputted main carrier MC (see FIG. 2(a-1)) by the inputted subcarrier SC. Consequently, a modulated optical signal $OS_{mod}$ is produced, and is outputted to the second external optical modulating portion 120-2. The optical spectrum of the modulated optical signal $OS_{mod}$ has a component of the main carrier MC at a center optical frequency ν, and further has components of sidebands (an upper sideband and a lower sideband) at frequencies spaced an integral multiple of the optical frequency $f_0$ apart from the optical frequency ν (only $\pm f_0$ are illustrated).

A baseband signal $S_{BB}$ having a frequency $f_1$ to be transmitted is inputted to the second external optical modulating portion 120-2 from the outside of the optical transmitter 101. The second external optical modulating portion 120-2 also has a Mach-Zehnder type structure, for example (see the first embodiment), and amplitude-modulates the inputted modulated optical signal $OS_{mod}$ (see FIG. 4(a-3)) by the inputted baseband signal $S_{BB}$. Consequently, a double-modulated optical signal $OS_{dmod}$ is produced. The optical spectrum of the double-modulated optical signal $OS_{dmod}$ has a component of the main carrier MC at a center optical frequency ν, and further has components of sidebands (an upper sideband and a lower sideband) at frequencies spaced an integral multiple of the optical frequency $f_0$ apart from the optical frequency ν (only $\pm f_0$ are illustrated). The occupied frequency bands of the components of both the sidebands depend on the frequency $f_1$. A component of the baseband signal $S_{BB}$ in FIG. 4(b-3) differs from that in FIG. 2(b-1) in that it also occurs with respect to the main carrier MC.

The double-modulated optical signal $OS_{dmod}$ as described above is inputted to the optical filter portion 130. In the optical transmitter-receiver shown in FIG. 3, the optical filter portion 130 and the subsequent components perform the same operations as those of the corresponding components in the optical transmitter-receiver shown in FIG. 1. In the second embodiment, therefore, description of the corresponding components is not repeated. However, a modulating method according to the second embodiment differs from that in the first embodiment and hence, it will be noted that almost all of the equations used in the first embodiment are not applied in the second embodiment.

In the optical transmitter-receiver shown in FIG. 3, the first external optical modulating portion 120-1 performs modulation using the subcarrier SC, and the second external optical modulating portion 120-2 performs modulation using the baseband signal $S_{BB}$. However, the first external optical modulating portion 120-1 may perform amplitude modulation using the baseband signal $S_{BB}$, and the second external optical modulating portion 120-2 may perform amplitude modulation using the subcarrier SC.

Also in the optical transmitter-receiver according to the second embodiment, the optical filter portion 130 in the optical transmitter 101 extracts only an optical signal OS from the double-modulated optical signal $OS_{dmod}$, and outputs the optical signal OS to the optical fiber 140. However, the optical filter portion 130 may be provided in the optical receiver 102. In this case, the optical transmitter 101 directly outputs the double-modulated optical signal $OS_{dmod}$ produced by the second external optical modulating portion 120-2 to the optical fiber 140. The optical receiver 102 extracts only the optical signal OS from the double-modulated optical signal $OS_{dmod}$ incident from the optical fiber 140 using the optical filter 130 set at a front end, and then optical/electrical converts the extracted optical signal OS using the optical/electrical converting portion 150 set at a back end.

Third Embodiment

Figure 5:
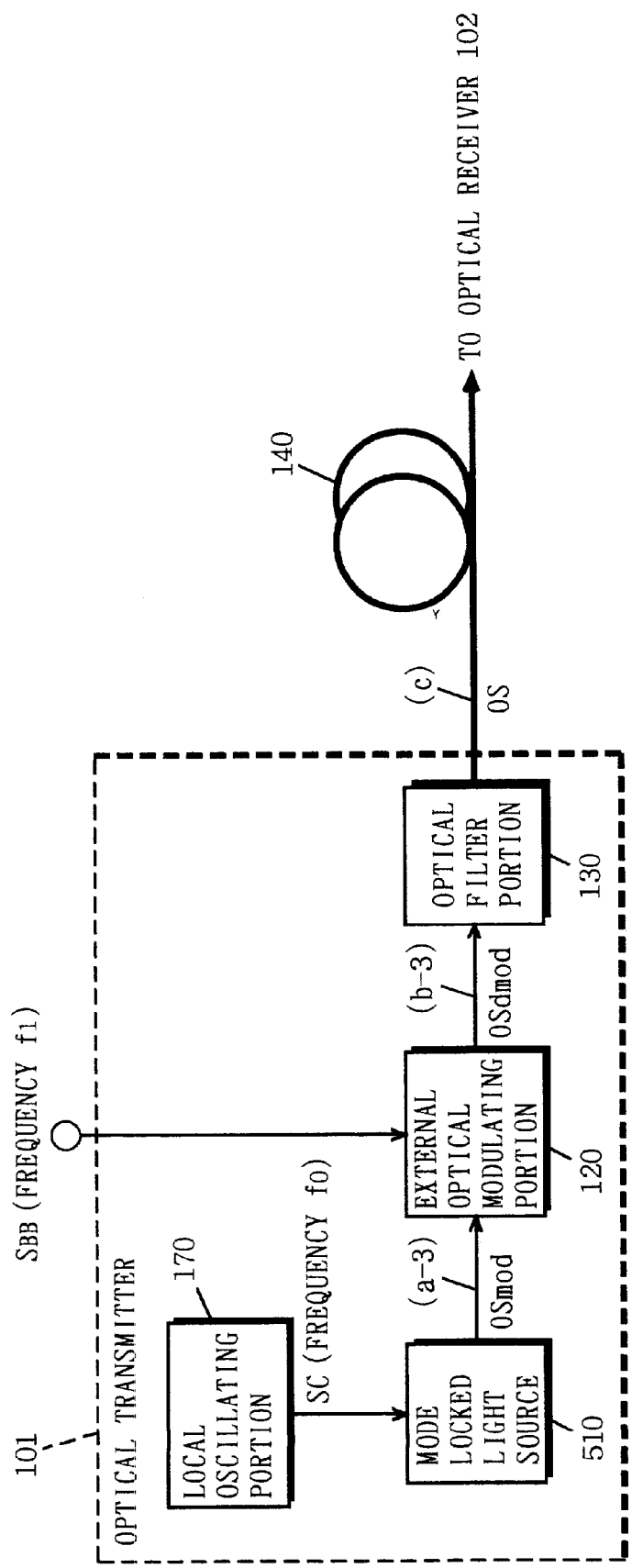
FIG. 5 is a block diagram showing the structure of only an optical transmitter with respect to an optical transmitter-receiver according to a third embodiment of the present invention.

FIG. 5 is a block diagram showing the structure of only an optical transmitter with respect to an optical transmitter-receiver according to a third embodiment of the present invention. Although an optical receiver is not illustrated in FIG. 5, the optical receiver 102 shown in FIG. 1 or 3 can be connected.

The optical transmitter 101 shown in FIG. 5 comprises a local oscillating portion 170, a mode locked light source 510, an external optical modulating portion 120, and an optical filter portion 130.

The optical transmitter 101 shown in FIG. 5 will be described with reference to FIGS. 2, 4 and 5.

The local oscillating portion 170 outputs the same subcarrier SC as described above. The mode locked light source 510 is mode-locked by an inputted subcarrier SC, to oscillate in a multimode. Although there are two types of methods of mode locking: a method by electrical driving and a method by optical injection, either one of the methods may be used. If spacing between mode locking frequencies is so set as to be equal to the frequency of the subcarrier SC, the same optical signal as the modulated optical signal $OS_{mod}$ shown in FIG. 4(a-3) (this optical signal is also referred to as a modulated optical signal $OS_{mod}$ for convenience, although exactly speaking, it oscillates in a multimode in a wider optical frequency band) is outputted to the external optical modulating portion 120 from the mode locked light source 510.

The same baseband signal $S_{BB}$ as described above is inputted to the external optical modulating portion 120 from the outside of the optical transmitter 101. The external optical modulating portion 120 amplitude-modulates the inputted modulated optical signal $OS_{mod}$ by the inputted baseband signal $S_{BB}$, to produce and output a double-modulated optical signal $OS_{dmod}$ shown in FIG. 4(b-3).

Although the double-modulated optical signal $OS_{dmod}$ as described above is inputted to the optical filter portion 130, the optical filter portion 130 and the subsequent components are the same as the corresponding components in FIG. 1 or 3 and hence, the description thereof is not repeated.

Fourth Embodiment

Figure 6:
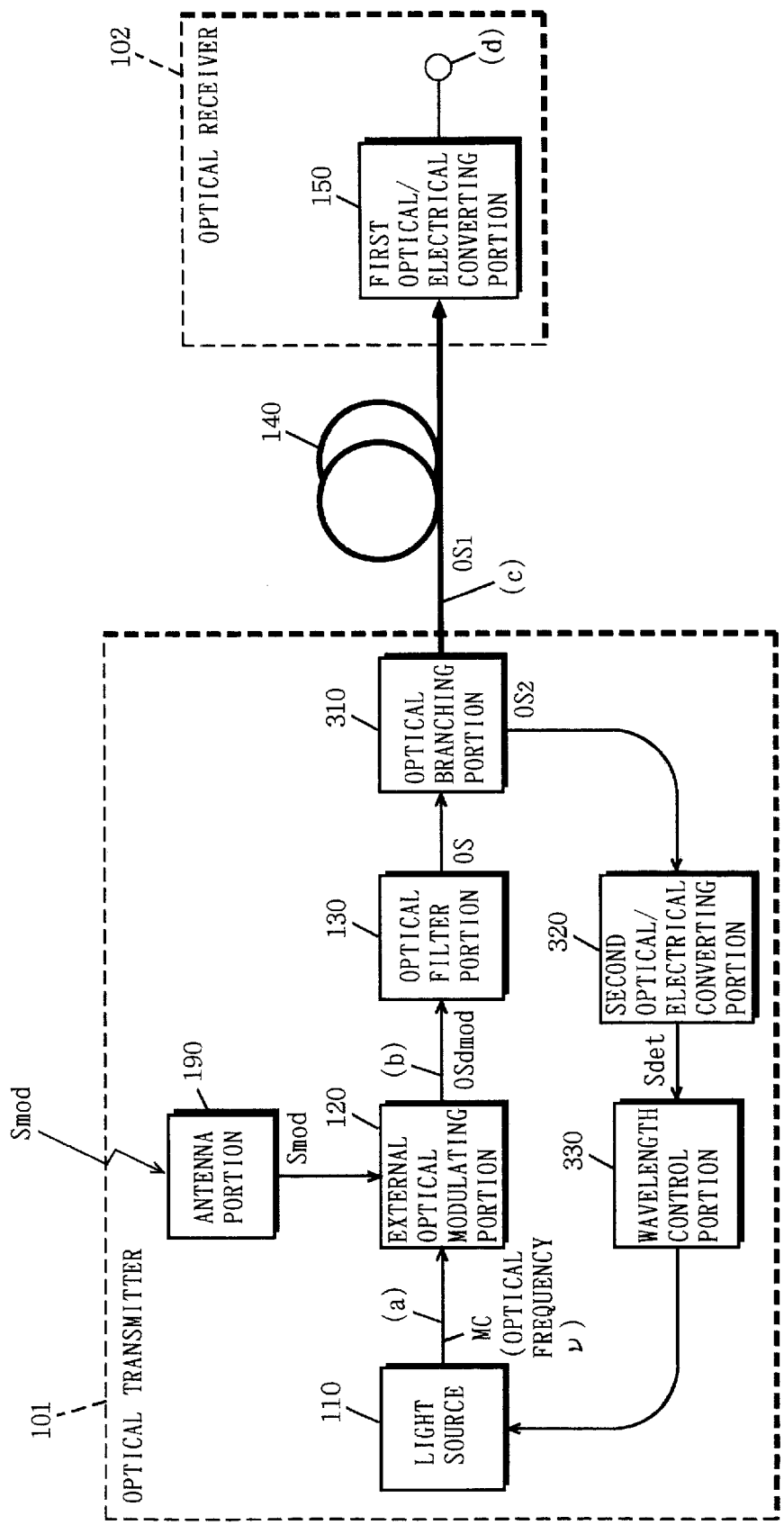
FIG. 6 is a block diagram showing the structure of an optical transmitter-receiver according to a fourth embodiment of the present invention.

FIG. 6 is a block diagram showing the structure of an optical transmitter-receiver according to a fourth embodiment of the present invention. Since the optical transmitter-receiver shown in FIG. 6 is the same as the optical transmitter-receiver shown in FIG. 1 except that it further comprises an optical branching portion 310, a second optical/electrical converting portion 320, and a wavelength control portion 330, the same reference numerals are assigned to the corresponding components and hence, the description thereof is not repeated. It will be noted that the optical/electrical converting portion 150 and the optical signal OS transmitted through the optical fiber 140 shown in FIG. 1 are respectively referred to as a first optical/electrical converting portion 150 and a first optical signal $OS_1$ as can be seen by referring to FIG. 6 in the fourth embodiment for convenience of illustration (see FIG. 6).

The operations of the optical transmitter-receiver according to the fourth embodiment will be described centered with respect to a difference from the optical transmitter-receiver shown in FIG. 1 on the basis of FIG. 6.

In FIG. 6, an optical signal OS is outputted from an optical filter portion 130, and is inputted to the optical branching portion 310, as described in the first embodiment. The optical branching portion 310 branches the inputted optical signal OS into a first optical $OS_1$ and a second optical signal $OS_2$, and outputs the first optical signal $OS_1$ to an optical fiber 140, while outputting the second optical signal $OS_2$ to the second optical/electrical converting portion 320. The first optical signal $OS_1$ is transmitted through the optical fiber 140, and is then processed by the first optical/electrical converting portion 150 in the same manner as that in the first embodiment.

The second optical/electrical converting portion 320 also optical/electrical converts the inputted second optical signal $OS_2$ and outputs an electrical signal. The electrical signal is referred to as a detecting signal $S_{det}$.

The wavelength control portion 330 detects the average values of detecting signals $S_{det}$ inputted at predetermined time intervals. The wavelength control portion 330 selects the maximum value $V_{max}$ out of the detected average values, and controls the temperature of a light source 110 or a bias current such that the maximum value $V_{max}$ is always detected, to control the wavelength (the optical frequency) of a main carrier MC.

In the optical transmitter-receiver, the oscillation wavelength of the light source 110 and/or the passband of the optical filter portion 130 may, in some cases, be shifted from a predetermined oscillation wavelength and/or a predetermined passband due to changes with time and changes in ambient temperature. When such a shift occurs, the optical filter portion 130 cannot accurately extract only a component of an upper sideband or a component of a lower sideband out of components included in a double-modulated optical signal $OS_{dmod}$ (a component of the main carrier and components of both sidebands). Although in the optical transmitter-receiver according to the fourth embodiment, the wavelength control portion 330 monitors the optical signal OS, to carry out feed back control of the oscillation wavelength of the light source 110, however, it is possible to correct, even if the above-mentioned shift occurs, the shift, so that the optical filter portion 130 can always accurately extract only one of the sidebands.

Fifth Embodiment

Figure 7:
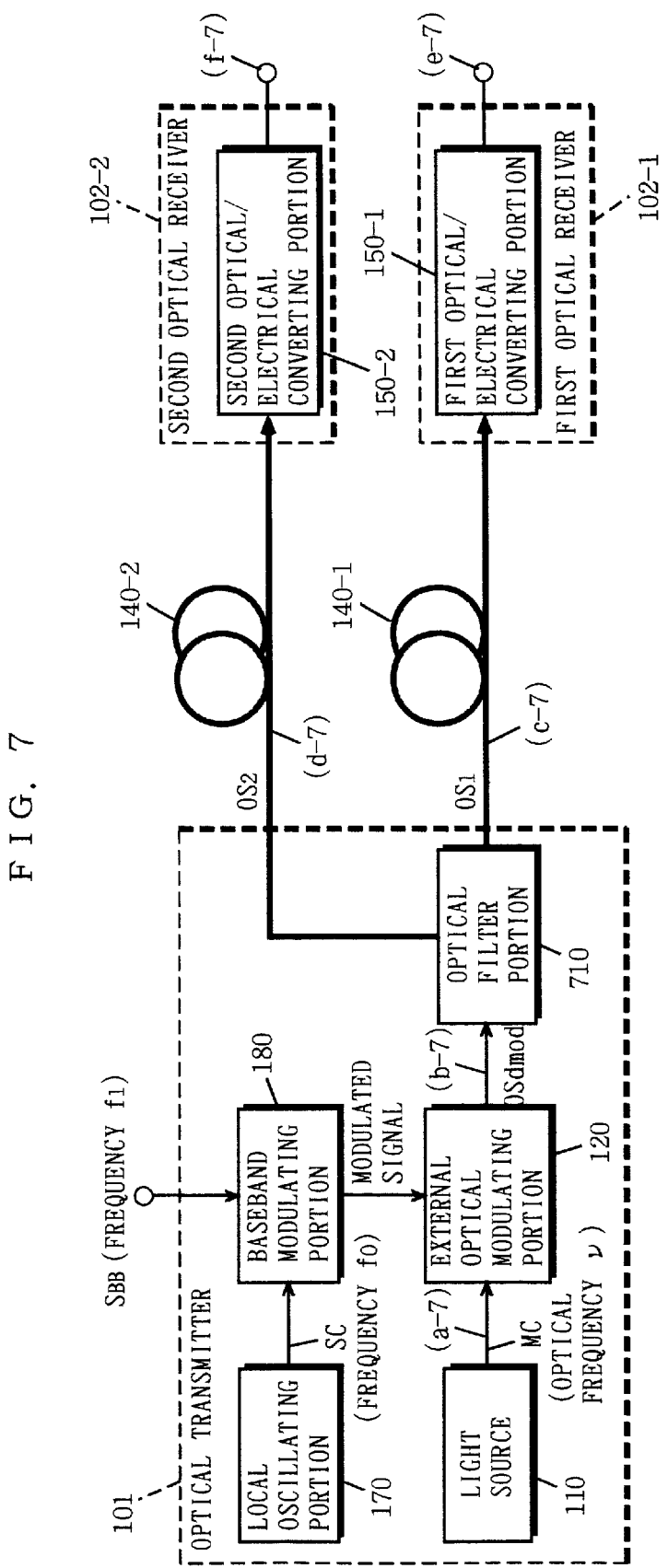
FIG. 7 is a block diagram showing the structure of an optical transmitter-receiver according to a fifth embodiment of the present invention.

FIG. 7 is a block diagram showing the structure of an optical transmitter-receiver according to a fifth embodiment of the present invention. Since the optical transmitter-receiver shown in FIG. 7 is roughly the same as the optical transmitter-receiver shown in FIG. 1 except that it further comprises a second optical receiver 102-2 connected to an optical transmitter 101 through a second optical fiber 140-2 such that optical transmission is possible, the same reference numerals are assigned to the corresponding components and hence, the description thereof is simplified. It will be noted that the optical fiber 140, the optical receiver 102, and the optical/receiver converting portion 150 shown in FIG. 1 are respectively referred to as a first optical fiber 140-1, a first optical receiver 102-1, and a first optical/electrical converting portion 150-1 in the fifth embodiment for convenience of illustration, and the optical signal OS shown in FIG. 1 is referred to as a first optical signal $OS_1$.

The optical transmitter 101 shown in FIG. 7 differs from the optical transmitter 101 shown in FIG. 1 in that the optical filter portion 130 is replaced with an optical filter portion 710. Further, the second optical receiver 102-2 comprises a second optical/electrical converting portion 150-2.

Figure 8:
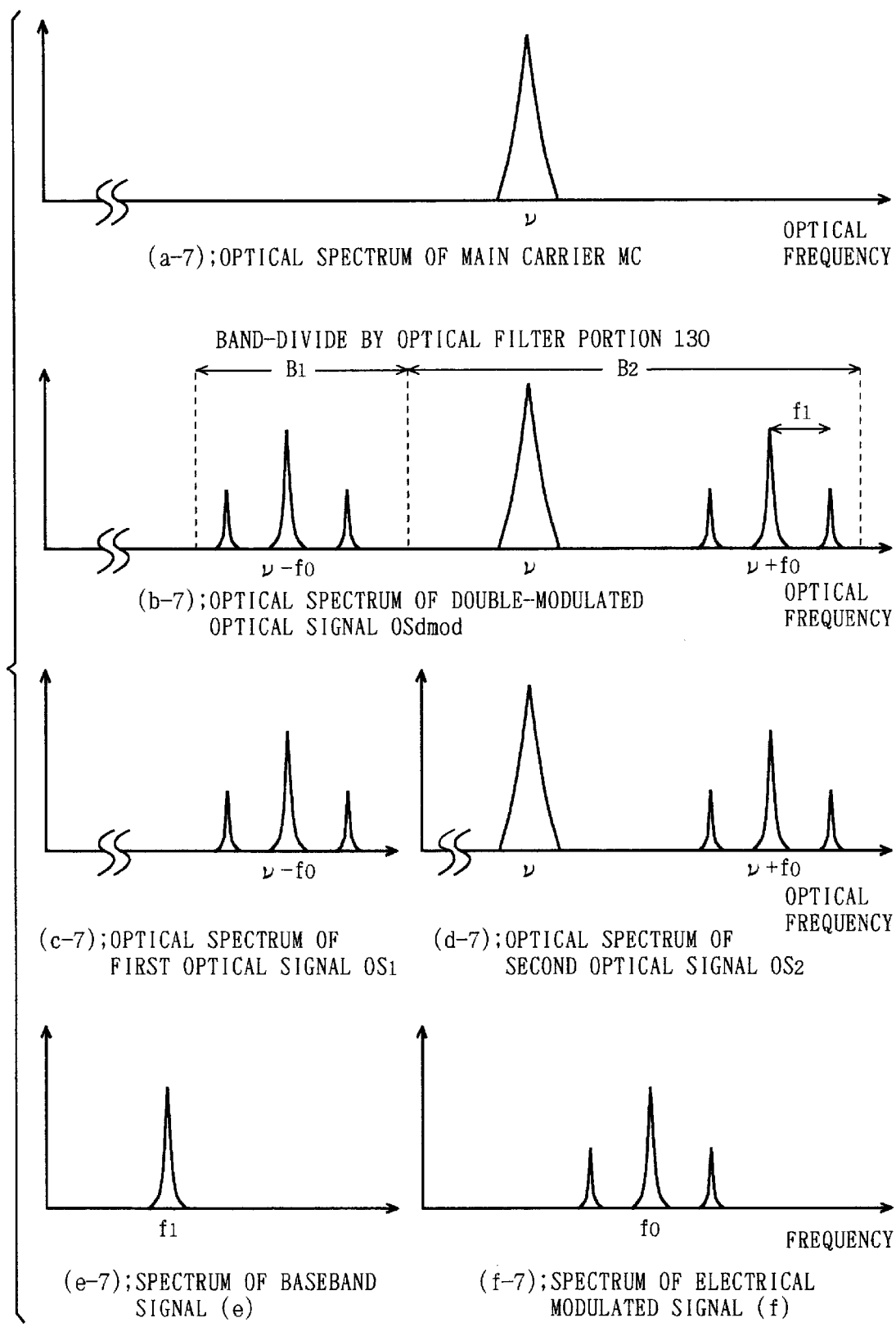
FIGS. 8(*a*-7) to (*f*-7) schematically illustrate spectrums of signals in principal parts (*a*-7) to (*f*-7) of the optical transmitter-receiver shown in FIG. 7.

FIGS. 8(a-7) to (f-7) schematically illustrate spectrums of signals in principal parts (a-7) to (f-7) of the optical transmitter-receiver shown in FIG. 7.

The operations of the optical transmitter-receiver according to the fifth embodiment will be described centered with respect to a difference from the optical transmitter-receiver shown in FIG. 1 on the basis of FIGS. 7 and 8.

In the optical transmitter 101, a baseband modulating portion 180 amplitude-modulates a subcarrier SC inputted from a local oscillating portion 170 by a baseband signal $S_{BB}$ inputted from the outside of the optical transmitter 101 at a degree of modulation m, to produce a modulated electrical signal $S_{mod}$, as described in the first embodiment. Let I(t) be the current waveform of the baseband signal $S_{BB}$. The voltage waveform $V_d(t)$ of the modulated electrical signal $S_{mod}$ is expressed by the foregoing equation (2), and is outputted to an external optical modulating portion 120.

A light source 110 outputs a main carrier MC having the optical spectrum as shown in FIG. 8(a-7). FIG. 8(a-7) is the same as FIG. 2(a-1). The external optical modulating portion 120 amplitude-modulates the main carrier MC inputted from the light source 110 by the modulated electrical signal $S_{mod}$ inputted from the baseband modulating portion 180, as described in the first embodiment, to produce and output a double-modulated optical signal $OS_{dmod}$ having the optical spectrum as shown in FIG. 8(b-7). The optical spectrum shown in FIG. 8(b-7) is the same as that shown in FIG. 2(b-1). The field strength waveform E(t) of the double-modulated optical signal $OS_{dmod}$ is finally expressed by the foregoing equation (7), as described in the first embodiment.

As described in the foregoing, the double-modulated optical signal $OS_{dmod}$ is inputted to the optical filter portion 710. The optical frequency passband of the optical filter portion 710 is so set that the inputted double-modulated optical signal $OS_{dmod}$ is divided into a component of a lower sideband included in a band $B_1$ and components of an upper sideband and the main carrier which are included in a band $B_2$ as shown in FIG. 8(b-7). The optical filter portion 710 outputs the component of the lower sideband divided to the first optical fiber 140-1 as a first optical signal $OS_1$, while outputting the components of the upper sideband and the main carrier divided to the second optical fiber 140-2 as a second optical signal $OS_2$.

Figure 9:
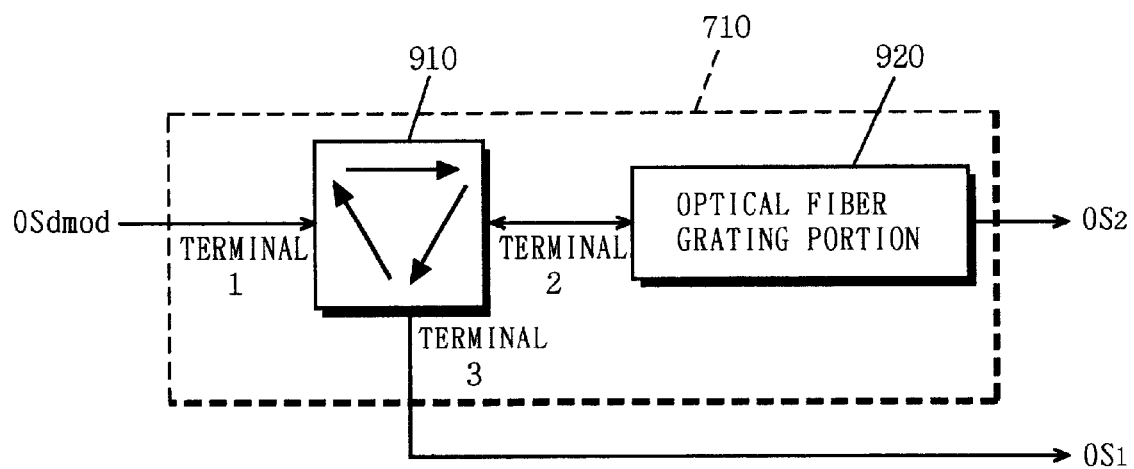
FIG. 9 is a block diagram showing the detailed structure of optical filter portions 710.

The detailed structures and the operations of the optical filter portion 710 will be described on the basis of FIGS. 8 and 9. In FIG. 9, the optical filter portion 710 comprises an optical circulator portion 910 having terminals 1, 2 and 3 and an optical fiber grating portion 920. The terminals 1, 2 and 3 are connected to the external optical modulating portion 120, the optical fiber grating portion 920, and the optical fiber 140-1.

The double modulated optical signal $OS_{dmod}$ inputted to the terminal 1 of the optical circulator portion 910 from the external optical modulating portion 120 is outputted as it is only to the optical fiber grating portion 920 connected to the terminal 2. The optical fiber grating portion 920 is a narrowband optical notch filter, and is so set as to reflect only the component included in the band $B_1$ shown in FIG. 8(*b*-7) in the inputted double-modulated optical signal $OS_{dmod}$. Consequently, the first optical signal $OS_1$ is reflected. As a result, the first optical signal $OS_1$ is incident on the optical circulator portion 910 from the terminal 2 again, and is outputted as it is only to the first optical fiber 140-1 connected to the terminal 3.

Since the optical fiber grating portion 920 passes components of bands other than a reflected band (outside the band $B_1$) in the inputted double-modulated optical signal $OS_{dmod}$, the second optical signal $OS_2$ is outputted to the second optical fiber 140-2.

As described in the foregoing, the optical filter portion 710 can realize optical filtering processing for a narrow band in simple construction by combining an optical circulator and an optical fiber grating which are existing optical components.

The optical spectrum of the first optical signal $OS_1$ is included in an optical frequency band in the vicinity of an optical frequency $\nu - f_0$, as shown in FIG. 8(*c*-7). The field strength waveform $E_{os1}(t)$ of the first optical signal $OS_1$ is expressed by the following equation (16). When the following equation (16) is arranged, the following equation (17) is obtained:

$$Eos_1 = \frac{E}{2}J_0\left(\frac{km_d}{2}\right)\left\{J_1(k)J_0\left(\frac{km_d}{2}\right)\cos(\omega - \omega_0)t - \right. \tag{16}$$

$$J_0(k)J_1\left(\frac{km_d}{2}\right)(\cos(\omega - \omega_0 + \omega_1)t +$$

$$\left. \cos(\omega - \omega_0 - \omega_1)t)\right\}$$

$$E_{os1}(t) = K\cos(\omega - \omega_0)t(1 - m'\cos\omega_1 t) \tag{17}$$

In the foregoing equation (16), m' and K are respectively expressed by the foregoing equations (10) and (11).

The optical spectrum of the second optical signal $OS_2$ is included in an optical frequency band from the vicinity of an optical frequency $\nu$ to the vicinity of an optical frequency $\nu + f_0$, as shown in FIG. 8(*d*-7). The waveform $E_{os2}(t)$ of the second optical signal $OS_2$ is expressed by the following equation (18):

$$Eos_2(t) = \frac{E}{2}\cos(2\pi\nu t) + \frac{E}{2}J_1(k)J_0^2\left(\frac{km_d}{2}\right)\cos(\omega + \omega_0)t - \tag{18}$$

$$\frac{E}{2}J_0(k)J_0\left(\frac{km_d}{2}\right)J_1\left(\frac{km_d}{2}\right)2\cos\omega_1 t\cos(\omega + \omega_0)t$$

When the foregoing equation (18) is arranged using m' and K, the following equation (19) is obtained:

$$E_{OS2}(t) = \frac{E}{2}\cos(2\pi\nu t) + K\cos(\omega + \omega_0)t(1 - m'\cos\omega_1 t) \tag{19}$$

The first optical signal $OS_1$ and the second optical signal $OS_2$ as described on the basis of the equations and FIG. 8, for example, are respectively transmitted through the first optical fiber 140-1 and the second optical fiber 140-2, and are incident on the first optical receiver 102-1 and the second optical receiver 102-2. Consequently, both the optical signals $OS_1$ and $OS_2$ are transmitted to a remote location.

In the first optical receiver 102-1, the first optical/electrical converting portion 150-1 optical/electrical converts the incident first optical signal $OS_1$ and outputs an electrical signal. It is found by referring to FIG. 8(*c*-7) that the first optical signal $OS_1$ is equivalent to one amplitude-modulated the carrier having the optical frequency $\nu - f_0$ by the baseband signal $S_{BB}$ (=cos $2\pi f_1 t$). Consequently, the current waveform $I_{pd1}(t)$ of an electrical signal outputted by the first optical/electrical converting portion 150-1 is expressed by the following equation (20):

$$I_{pd1}(t) = \frac{\eta_1}{2}K^2(1 - m'\cos\omega_1 t)^2 \tag{20}$$

$$= I_{pd1}(1 - 2m'\cos\omega_1 t + m'^2\cos^2\omega_1 t)$$

where $\eta_1$ is the conversion efficiency of the first optical/electrical converting portion 150-1, and $I_{pd1}$ is a DC component. As can be understood by referring to the foregoing equation (20), if only a component having a frequency $f_1$ is extracted using a band-pass filter or the like from the electrical signal outputted from the first optical/electrical converting portion 150-1, an amplitude modulation component of the first optical signal $OS_1$, that is, the current waveform I(t) of the baseband signal $S_{BB}$ is directly obtained, as shown in FIG. 8(*e*-7). It is easily feasible to extract only the component having the frequency $f_1$ by connecting the band-pass filter to a back end against the optical/electrical converting portion 150. In the first optical/electrical converting portion 150-1, there may be a frequency band enough to obtain the baseband signal $S_{BB}$.

In the second optical receiver 102-2, the second optical/electrical converting portion 150-2 optical/electrical converts the incident second optical signal $OS_2$ and outputs an electrical signal. It is found by referring to FIG. 8(*f*-7) that the second optical signal $OS_2$ is equivalent to a signal in which the main carrier MC is single-sideband modulated by the above-mentioned modulated electrical signal $S_{mod}$ (a signal in which the subcarrier SC is amplitude-modulated by the baseband signal $S_{BB}$). Consequently, the current waveform $I_{pd2}(t)$ of an electrical signal outputted by the second optical/electrical converting portion 150-2 is expressed by the following equation (21):

$$I_{pd2}(t) = \left(\frac{E}{2}\right)\eta_2\frac{2K}{2}\cos\omega_0 t(1 - m'\cos\omega_1 t) \tag{21}$$

where $\eta_2$ is the conversion efficiency of the second optical/electrical converting portion 150-2, and $I_{pd2}$ is a DC component. As can be understood by referring to the foregoing equation (21), if only a component having a frequency $f_0$ is extracted using a band-pass filter or the like from the electrical signal outputted from the second optical/electrical converting portion 150-2, an amplitude modulation component of the second optical signal $OS_2$, that is, the modulated electrical signal $S_{mod}$ having a band of the frequency $f_0$ is directly and reasonably obtained, as shown in FIG. 8 (f-7). It is easily feasible to extract only the component having the frequency $f_0$ by connecting the band-pass filter to a back end against the optical/electrical converting portion 150. In the second optical/electrical converting portion 150-2, there may be a frequency band enough to obtain the modulated electrical signal $S_{mod}$.

As described in the foregoing, the optical transmitter 101 shown in FIG. 7 divides the double-modulated optical signal $OS_{dmod}$ obtained by double-modulating the main carrier MC into the component of one of the sidebands and the components of the main carrier and the other sideband by optical filtering, and optically transmits the components. The first and second optical receivers 102-1 and 102-2 can respectively obtain the baseband signal $S_{BB}$ and the modulated electrical signal $S_{mod}$ by separately optical/electrical converting the components. The optical transmitter-receiver can thus simultaneously optically transmit the baseband signal $S_{BB}$ and the modulated electrical signal $S_{mod}$ in which the subcarrier SC is amplitude-modulated by the baseband signal using the same light source 110.

Although in the fifth embodiment, the optical filter portion 710 band-divides the double-modulated optical signal $OS_{dmod}$ into the component of the lower sideband and the components of the upper sideband and the main carrier, it may band-divide the double-modulated optical signal $OS_{dmod}$ into the component of the upper sideband and the components of the lower sideband and the main carrier.

The modulated electrical signal $S_{mod}$ shown in FIG. 8 (f-7) is suitable for wireless transmission when $f_0$ is a microwave band or a millimeter-wave band. Therefore, an antenna (not shown) capable of radiating the modulated electrical signal $S_{mod}$ to a space is provided in a back end against the second optical/electrical converting portion 150-2, and the modulated electrical signal $S_{mod}$ is introduced into the antenna, so that the optical transmitter-receiver and a wireless transmission system can be easily interconnected.

In the fifth embodiment, when the modulated electrical signal $S_{mod}$ outputted from the baseband modulating portion 180 is a microwave band or a millimeter-wave band, it is difficult, if consideration is given to frequency response characteristics, to direct-optical-modulate the light source 110 by the modulated electrical signal $S_{mod}$ having such a high frequency. Therefore, the optical transmitter 101 has employed an external optical modulation system. If the modulated electrical signal $S_{mod}$ outputted from the baseband modulating portion 180 is not more than approximately a microwave band, it is also possible to directly drive the light source 110 by the modulated electrical signal $S_{mod}$ irrespective of the frequency response characteristics, and directly modulate the intensity of output light of the light source 110. That is, the optical transmitter-receiver can also employ a direct optical modulation system.

Sixth Embodiment

Figure 10:
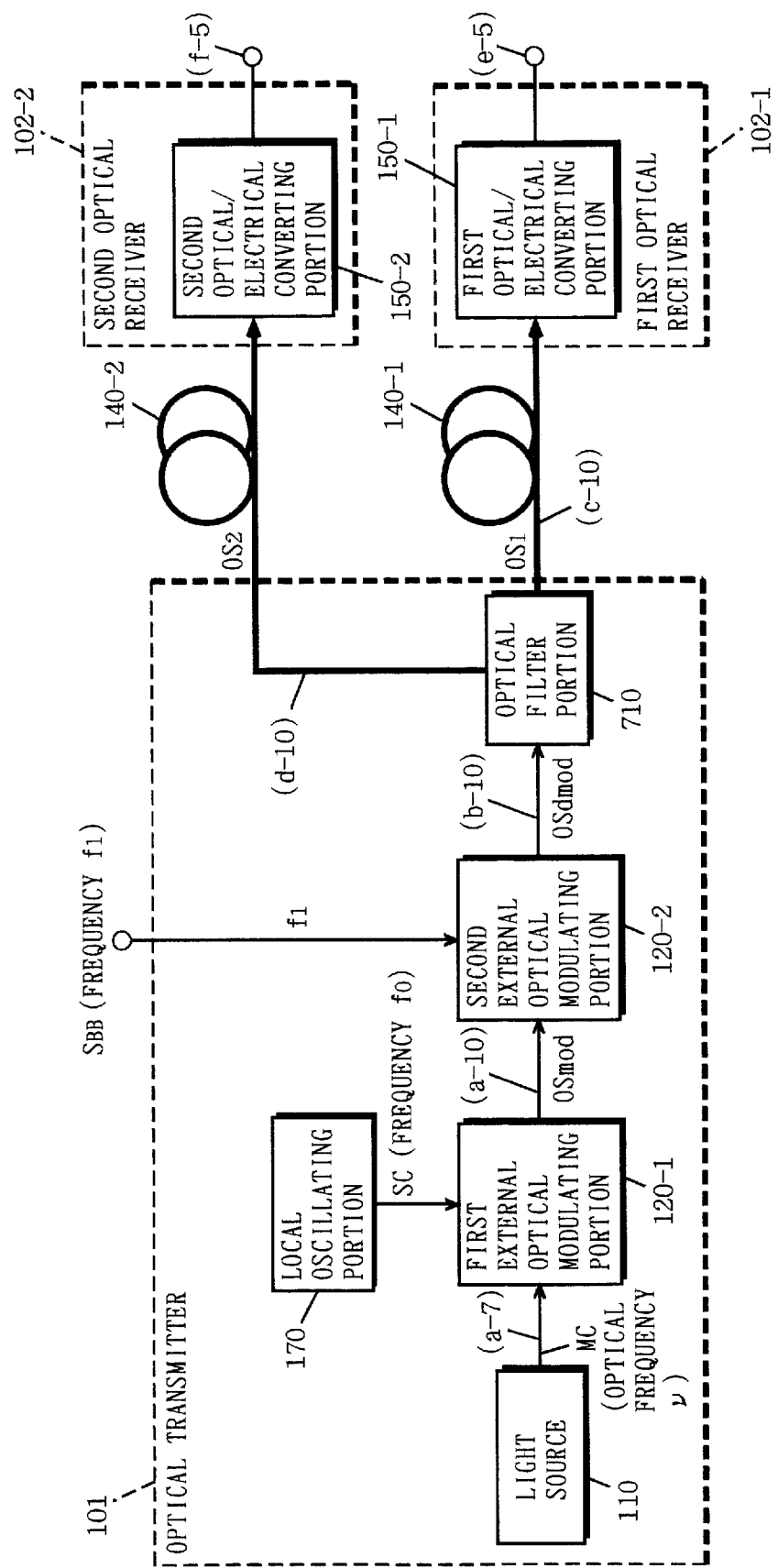
FIG. 10 is a block diagram showing the structure of an optical transmitter-receiver according to a sixth embodiment of the present invention.

FIG. 10 is a block diagram showing the structure of an optical transmitter-receiver according to a sixth embodiment of the present invention. Since the optical transmitter-receiver shown in FIG. 10 is roughly the same as the optical transmitter-receiver shown in FIG. 3 except that its further comprises a second optical receiver 102-2 connected to an optical transmitter 101 through a second optical fiber 140-2 such that optical transmission is possible, the same reference numerals are assigned to the corresponding components and hence, the description thereof is simplified. It will be noted that the optical fiber 140, the optical receiver 102, and the optical/electrical converting portion 150 shown in FIG. 3 are respectively referred to as a first optical fiber 140-1, a first optical receiver 102-1, and a first optical/electrical converting portion 150-1 in the sixth embodiment for convenience of illustration, and the optical signal OS shown in FIG. 3 is also referred to as a first optical signal $OS_1$.

The optical transmitter 101 shown in FIG. 10 differs from the optical transmitter 101 shown in FIG. 3 in that the optical filter portion 130 is replaced with an optical filter portion 710. Further, the second optical receiver 102-2 comprises a second optical/electrical converting portion 150-2.

Figure 11:
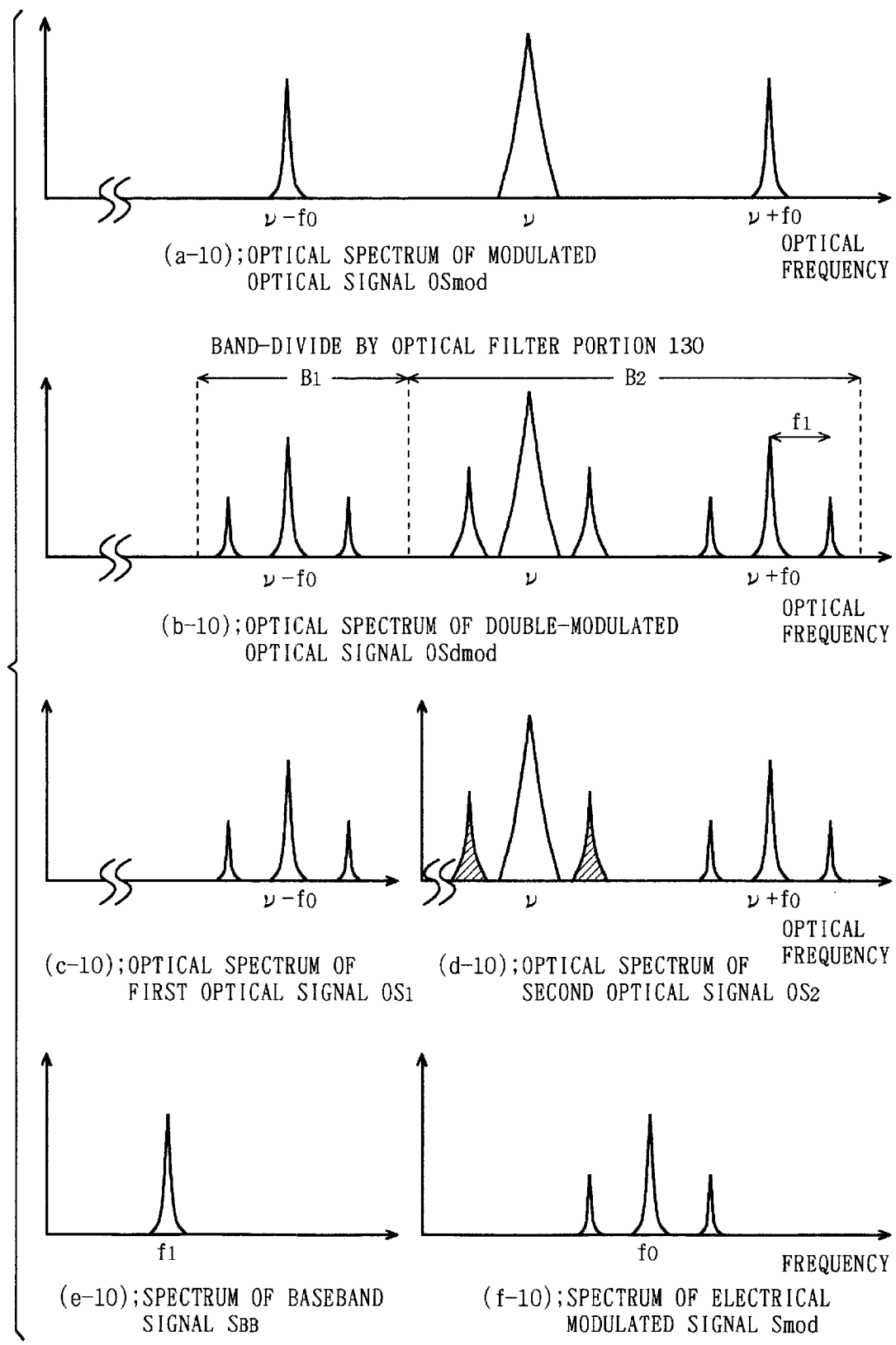
FIGS. 11(*a*-10) to (*f*-10) schematically illustrate spectrums of signals in principal parts (*a*-10) to (*f*-10) of the optical transmitter-receiver shown in FIG. 10.

FIGS. 11(a-10) to (f-10) schematically illustrate spectrums of signals in principal parts (a-10) to (f-10) of the optical transmitter-receiver shown in FIG. 10.

The operations of the optical transmitter-receiver according to the sixth embodiment will be described centered with respect to a difference from the optical transmitter-receiver shown in FIG. 3 on the basis of FIGS. 10 and 11, for example. In the optical transmitter 101, a light source 110 outputs a main carrier MC having the optical spectrum as shown in FIG. 8(a-7) to a first external optical modulating portion 120-1. A local oscillating portion 170 outputs the same subcarrier SC as described above to the first external optical modulating portion 120-1. The first external optical modulating portion 120-1 amplitude-modulates the inputted main carrier MC by the inputted subcarrier SC, to produce a modulated optical signal $OS_{mod}$ and output the produced modulated optical signal to the second external optical modulating portion 120-2. The optical spectrum of the modulated optical signal $OS_{mod}$ is the same as the optical spectrum shown in FIG. 4(a-3), as shown in FIG. 11(a-10) and hence, the details thereof are omitted.

As described in the second embodiment, a baseband signal $S_{BB}$ is inputted to the second external optical modulating portion 120-2 from the outside of the optical transmitter 101. The second external optical modulating portion 120-2 also amplitude-modulates the inputted modulated optical signal $OS_{mod}$ by the inputted baseband signal $S_{BB}$, to produce a double-modulated optical signal $OS_{dmod}$, as described in the second embodiment. The optical spectrum of the double-modulated optical signal $OS_{dmod}$ is the same as the optical spectrum shown in FIG. 4(b-3), as shown in FIG. 11(b-10) and hence, the details thereof are omitted.

The double-modulated optical signal $OS_{dmod}$ as described above is inputted to the optical filter portion 710. The optical frequency passband of the optical filter portion 710 is so set that the inputted double-modulated optical signal $OS_{dmod}$ is divided into a component of a lower sideband included in a band $B_1$ and components of an upper sideband and the main carrier which are included in a band $B_2$, as shown in FIG. 11(b-10). The optical filter portion 710 outputs the component of the lower sideband obtained by the division to the first optical fiber 140-1 as a first optical signal $OS_1$, while outputting the components of the upper sideband and the main carrier which are obtained by the division to the second optical fiber 140-2 as a second optical signal $OS_2$. The optical spectrum of the first optical signal $OS_1$ is included in an optical frequency band in the vicinity of an optical frequency $\nu-f_0$, as shown in FIG. 11(c-10). Further, the optical spectrum of the second optical signal $OS_2$ is included in an optical frequency band from the vicinity of $\nu$ to the vicinity of $\nu+f_0$, as shown in FIG. 11(d-10).

The first optical signal $OS_1$ and the second optical signal $OS_2$ as described above are respectively incident on the first optical receiver 102-1 and the second optical receiver 102-2, as described in the fifth embodiment. Consequently, both the optical signals $OS_1$ and $OS_2$ are transmitted to a remote location.

The first optical receiver 102-1 and the second optical receiver 102-2 are operated similarly to those in the fifth embodiment, to output a baseband signal $S_{BB}$ having the spectrum as shown in FIG. 11(e-10) and a modulated electrical signal (a signal that the subcarrier is amplitude-modulated by the baseband signal) $S_{mod}$ having the spectrum as shown in FIG. 11(f-10). As shown in FIG. 11(f-10), the modulated electrical signal $S_{mod}$ is approximately the same as the modulated electrical signal $S_{mod}$ shown in FIG. 8(f-7). Exactly speaking, however, the modulated electrical signal $S_{mod}$ shown in FIG. 11(f-10) induces slightly higher strain than that in the modulated electrical signal $S_{mod}$ shown in FIG. 8(f-7) due to the effect of the component of the main carrier MC (see a hatched portion). A modulating method according to the sixth embodiment differs from that in the fifth embodiment. Therefore, it will be noted that almost all of the equations used in the fifth embodiment are not applied in the sixth embodiment.

As described in the foregoing, according to the optical transmitter shown in FIG. 10, the optical spectrum of the double-modulated optical signal $OS_{dmod}$ obtained by double-modulating the main carrier MC (further amplitude-modulating by the baseband signal $S_{BB}$ the modulated optical signal $OS_{mod}$ that the main carrier is amplitude-modulated by the subcarrier) (see FIG. 11(b-10)) is divided into the component of one of the sidebands and the components of the main carrier and the other sideband by optical filtering, and the components are optically transmitted. The first optical receiver and the second optical receiver can respectively obtain the baseband signal $S_{BB}$ (see FIG. 11(e-10)) and the modulated electrical signal $S_{mod}$ (see FIG. 11(f-10)) by separately optical/electrical converting the components. The optical transmitter-receiver thus simultaneously optically transmits the baseband signal and the signal obtained upon amplitude-modulating the subcarrier by the baseband signal using the same light source 110.

Also in the optical transmitter-receiver shown in FIG. 10, the optical filter portion 710 may band-divide the double-modulated optical signal $OS_{dmod}$ into the component of the upper sideband and the components of the lower sideband and the main carrier.

Also in the optical transmitter-receiver shown in FIG. 10, the antenna (as described above) is provided in a back end against the second optical/electrical converting portion 150-2, and the modulated electrical signal $S_{mod}$ is introduced into the antenna, so that the optical transmitter-receiver can be easily connected to a wireless transmission system, similarly to the optical transmitter-receiver shown in FIG. 7.

Furthermore, in the optical transmitter-receiver shown in FIG. 10, the first external optical modulating portion 120-1 performs modulation using the subcarrier, and the second external optical modulating portion 120-2 performs modulation using the baseband signal. However, the first external optical modulating portion 120-1 may perform amplitude modulation using the baseband signal, and the second external optical modulating portion 120-2 may perform amplitude modulation using the subcarrier.

Seventh Embodiment

Figure 12:
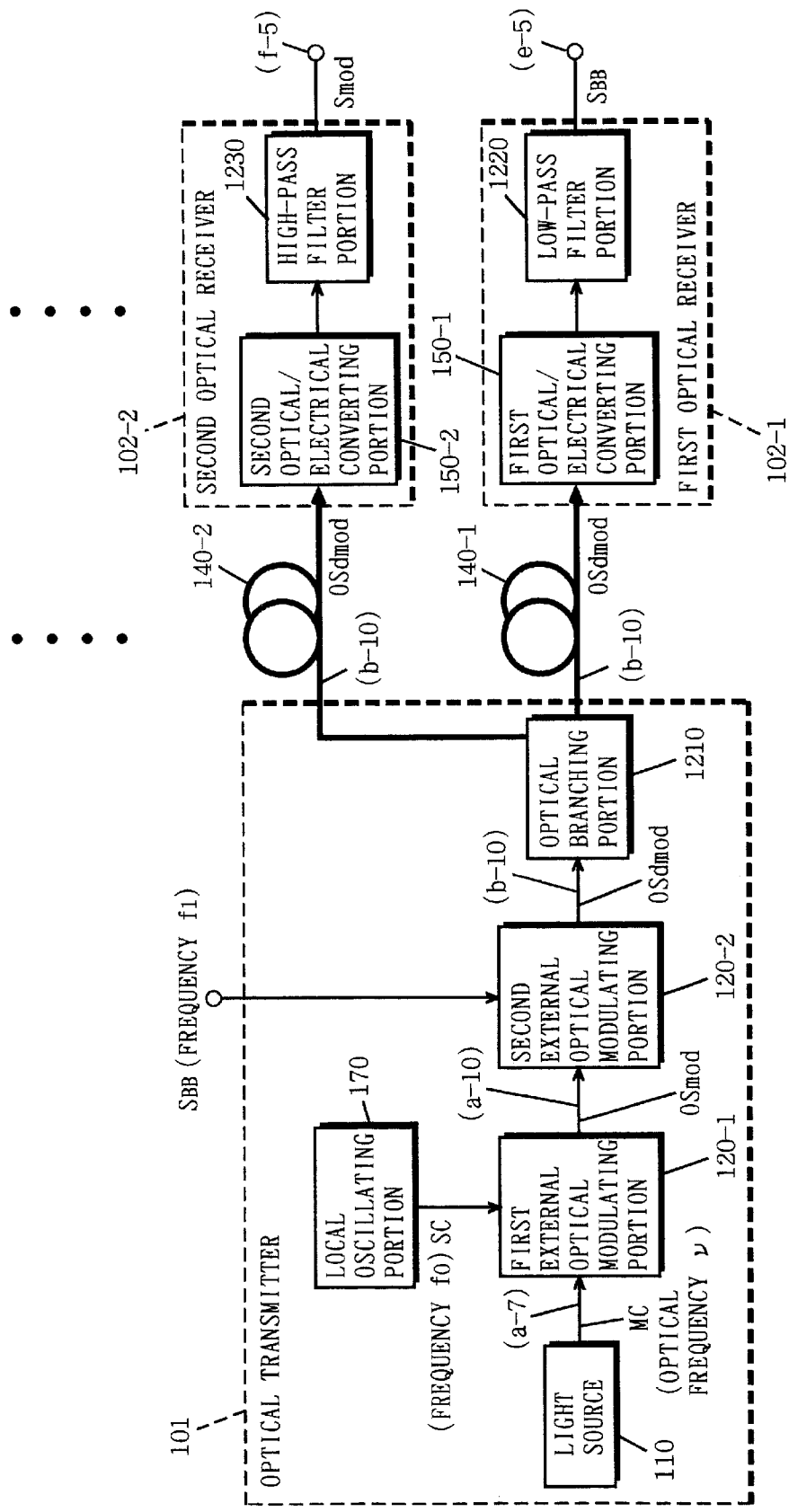
FIG. 12 is a block diagram showing the structure of an optical transmitter-receiver according to a seventh embodiment of the present invention.

FIG. 12 is a block diagram showing the structure of an optical transmitter-receiver according to a seventh embodiment of the present invention. Since the optical transmitter-receiver shown in FIG. 12 is the same as the optical transmitter-receiver shown in FIG. 10 except that an optical transmitter 101 comprises an optical branching portion 1210 in place of the optical filter portion 710, a first optical receiver 102-1 further comprises a low-pass filter portion 1220, and a second optical receiver 102-2 further comprises a high-pass filter portion 1230, the same reference numerals are assigned to the corresponding components and hence, the description thereof is not repeated.

The operations of the optical transmitter-receiver shown in FIG. 12 will be described on the basis of FIGS. 11 and 12.

A second external optical modulating portion 120-2 produces the same double-modulated optical signal $OS_{dmod}$ as that in the sixth embodiment (see FIG. 11(b-10)), and outputs the produced double-modulated optical signal to the optical branching portion 1210. The optical branching portion 1210 branches the inputted double-modulated optical signal $OS_{dmod}$ into a lot of double-modulated optical signals (two double-modulated optical signals in the description), and outputs the double-modulated optical signals to optical fibers 140-1 and 140-2.

One of the branched double-modulated optical signals $OS_{dmod}$ and the other double-modulated optical signal are thereafter transmitted through optical fibers 140-1 and 140-2, and are incident on a first optical/electrical converting portion 150-1 and a second optical/electrical converting portion 150-2, respectively. The first optical/electrical converting portion 150-1 and the second optical/electrical converting portion 150-2 respectively optical/electrical converts the double-modulated optical signals $OS_{dmod}$ and outputs electric signals. Received optical currents of the first optical/electrical converting portion 150-1 and the second optical/electrical converting portion 150-2 reasonably respectively include a component of a baseband signal $S_{BB}$ (see FIG. 11(e-10)) and a component of a modulated electrical signal $S_{mod}$ (see FIG. 11(f-10)).

The electrical signal outputted from the first optical/electrical converting portion 150-1 is inputted to the low-pass filter portion 1220, so that only a part included in a low frequency band of the electrical signal is outputted after passing through the low-pass filter portion 1220. Consequently, it is possible to obtain the baseband signal $S_{BB}$ (see FIG. 11(e-10)), as in the second embodiment.

On the other hand, an electrical signal outputted from the second optical/electrical converting portion 150-2 is inputted to the high-pass filter portion 1230, so that only a part included in a high frequency band of the electrical signal is outputted after passing through the high-pass filter portion 1230. Consequently, it is possible to obtain the modulated electrical signal $S_{mod}$ (see FIG. 11(f-10)), as in the second embodiment.

As described in the foregoing, according to the optical transmitter-receiver shown in FIG. 12, the double-modulated optical signal $OS_{dmod}$ obtained by double-modulating the same main carrier MC as that in the optical transmitter-receiver shown in FIG. 10 is branched into a lot of double-modulated optical signals, and the double-modulated optical signals are respectively optically transmitted. The first optical receiver and the second optical receiver can respectively obtain the baseband signal $S_{BB}$ and the modulated electrical signal $S_{mod}$ by separately optical/electrical-converting the double-modulated optical signals, followed by low-pass filtering and high-pass filtering. The optical transmitter-receiver can thus simultaneously optically transmit the baseband signal and the modulated electrical signal using the same light source 110.

The above-mentioned first and second optical receivers 102-1 and 102-2 respectively comprise the first and second optical/electrical converting portions 150-1 and 150-2 which differ in frequency bands which can be optical/electrical-converted. However, the first and second optical transmitter-receiver 102-1 and 102-2 may be the same, and may respectively comprise optical/electrical converting portions having sufficiently wide frequency bands to collectively optical/electrical-convert the double-modulated optical signal $OS_{dmod}$. In such a case, the first and second optical transmitter-receivers 102-1 and 102-2 can respectively obtain the baseband signal $S_{BB}$ and the modulated electrical signal $S_{mod}$ by low-pass filtering and high-pass filtering.

A transmitter other than that described in the sixth embodiment may be applied for the optical transmitter 101 with respect to the present invention.

Eight Embodiment

In the optical transmitter-receiver shown in FIG. 12, two-types of optical receivers which differ in structure are connected. If the optical receiver is constructed as described below, however, both a baseband signal $S_{BB}$ and a modulated electrical signal $S_{mod}$ can be obtained even if only one type of optical receiver is connected to an optical transmitter. The structure of the optical receiver will be described on the basis of FIG. 13.

Figure 13:
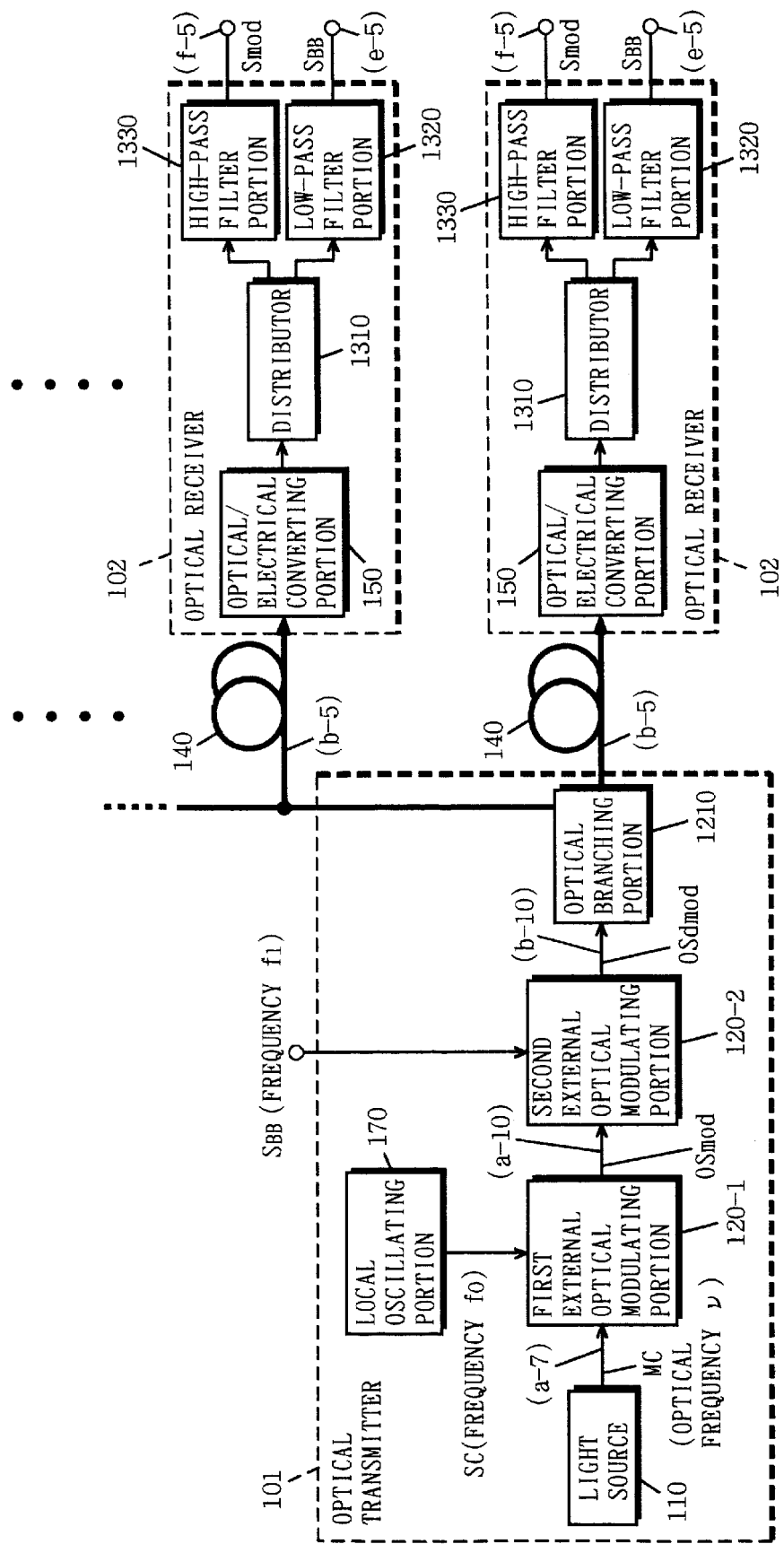
FIG. 13 is a block diagram showing the structure of an optical transmitter-receiver according to an eighth embodiment of the present invention.

In the optical transmitter-receiver shown in FIG. 13, an optical transmitter 101 and one or more optical receivers 102 are interconnected through optical fibers 140 such that optical transmission is possible. The optical transmitter 101 shown in FIG. 13 is the same in structure as the optical transmitter 101 shown in FIG. 12 and hence, the description thereof is not repeated. The optical receiver 102 shown in FIG. 13 has a different structure from the optical receiver 102-1 or 102-2 shown in FIG. 12, and comprises an optical/electrical converting portion 150, a distributor 1310, a low-pass filter portion 1320, and a high-pass filter portion 1330.

As can be also seen from the foregoing, a double-modulated optical signal $OS_{dmod}$ outputted from the optical transmitter 101 is transmitted through each of the optical fibers 140, and is incident on the optical/electrical converting portion 150 in the optical receiver 102. The optical/electrical converting portion 150 has wideband characteristics in which a frequency band from a low frequency band to a high frequency band can be optical/electrical-converted, and collectively optical/electrical-converts the double-modulated optical signal $OS_{dmod}$ and outputs an electrical signal obtained by the conversion to the distributor 1310. The electrical signal is distributed into a lot of electrical signals (two electrical signals in this description) by the distributor 1310. Only one of the electrical signals obtained by the distribution is inputted to the low-pass filter portion 1320, so that only a part included in a low frequency band of the electrical signal is outputted after passing through the low-pass filter portion 1320. Consequently, a baseband signal $S_{BB}$ (see FIG. 11(e-10)) is obtained.

Furthermore, the other electrical signal obtained by the distribution is inputted to the high-pass filter portion 1330, so that only a part included in a high frequency band of the electrical signal is outputted after passing through the high-pass filter portion 1330. Consequently, a modulated electrical signal $S_{mod}$ (see FIG. 11(f-10)) is obtained.

As described in the foregoing, if the optical transmitter-receiver comprises one optical receiver shown in FIG. 13, it can obtain both the baseband signal $S_{BB}$ and the modulated electrical signal $S_{mod}$, similarly to the optical transmitter-receiver shown in FIG. 12.

In FIG. 13, a plurality of (two in the drawing) optical receivers 102 are connected. The number of optical receivers 102 may be one depending on the construction conditions of the optical transmitter-receiver. In such a case, the necessity of an optical branching portion 1210 is eliminated, and a second external optical modulating portion 120-2 outputs the double-modulated optical signal $OS_{dmod}$ to the optical fiber 140.

In the optical transmitter-receivers according to the seventh and eighth embodiments, the first external optical modulating portion 120-1 and the second external optical modulating portion 120-2 perform amplitude modulation using a double sideband amplitude modulation system, as apparent by referring to FIG. 11. However, in the first external optical modulating portion 120-1 and the second external optical modulating portion 120-2 may perform amplitude modulation using a single sideband amplitude modulation system. According to the single sideband amplitude modulation system, the double-modulated optical signal $OS_{dmod}$ first has a component of a main carrier MC at a center optical frequency ν. The double-modulated optical signal $OS_{dmod}$ further has a component of an upper sideband or a lower sideband on the side of higher frequencies or lower frequencies than the optical frequency ν and at a frequency spaced an integral multiple of the optical frequency $f_0$. Although the double-modulated optical signal $OS_{dmod}$ is transmitted through each of the optical fibers, it can be optically transmitted over a longer distance because it is not easily affected by wavelength dispersion by the optical fiber 140, as compared with that in the case of double sideband amplitude modulation.

Ninth Embodiment

Figure 14:
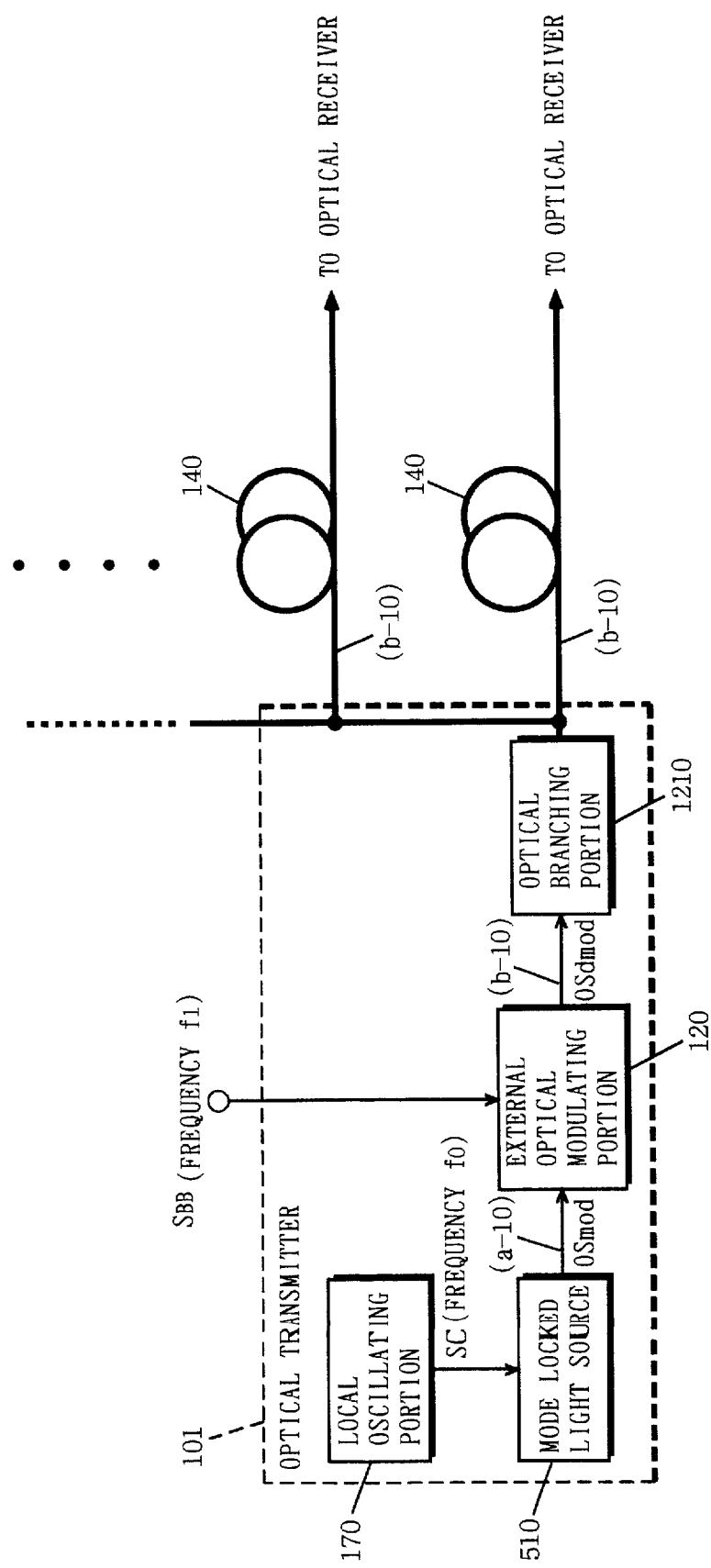
FIG. 14 is a block diagram showing the structure of only an optical transmitter with respect to an optical transmitter-receiver according to a ninth embodiment of the present invention.

FIG. 14 is a block diagram showing the structure of only an optical transmitter with respect to an optical transmitter-receiver according to a ninth embodiment of the present invention. Although an optical receiver is not illustrated in FIG. 14, the optical receivers 102-1 and 102-2 shown in FIG. 12 or the optical receiver 102 shown in FIG. 13 can be connected. Since an optical transmitter 101 shown in FIG. 14 is the same as the optical transmitter 101 shown in FIG. 5 except that the optical filter portion 130 is replaced with an optical branching portion 1210, the same reference numerals are assigned to the corresponding components. The optical branching portion 1210 was described referring to FIG. 12, for example. Therefore, the operations of the optical transmitter 101 shown in FIG. 14 are apparent from the descriptions and hence, the description thereof is simplified.

A mode locked light source 510 is mode-locked by a subcarrier SC inputted from a local oscillating portion 170, to oscillate in a multimode. IF spacing between mode locking frequencies is so set as to be equal to the frequency of the subcarrier SC, a modulated optical signal $OS_{mod}$ (see FIG. 11(a-10)) is outputted to an external optical modulating portion 120 from the mode locked light source 510. The external optical modulating portion 120 produces a double-modulated optical signal $OS_{dmod}$ (see FIG. 11(b-10)) on the basis of the inputted modulated optical signal $OS_{mod}$ and a baseband signal $S_{BB}$ inputted from outside, and outputs the produced double-modulated optical signal $OS_{mod}$ to the optical branching portion 1210. The optical branching portion 1210 branches the inputted double-modulate optical signal $OS_{dmod}$ into a lot of double-modulated optical signals, and then outputs the obtained double-modulated optical signals to each of optical fibers 140.

Also in the optical transmitter-receiver shown in FIG. 14, at least one optical receiver 102 may be connected. When the number of optical receivers is one, the necessity of the optical branching portion 1210 is eliminated, and the external optical modulating portion 120 outputs the double-modulated optical signal $OS_{dmod}$ to the optical fiber 140.

Tenth Embodiment

Figure 15:
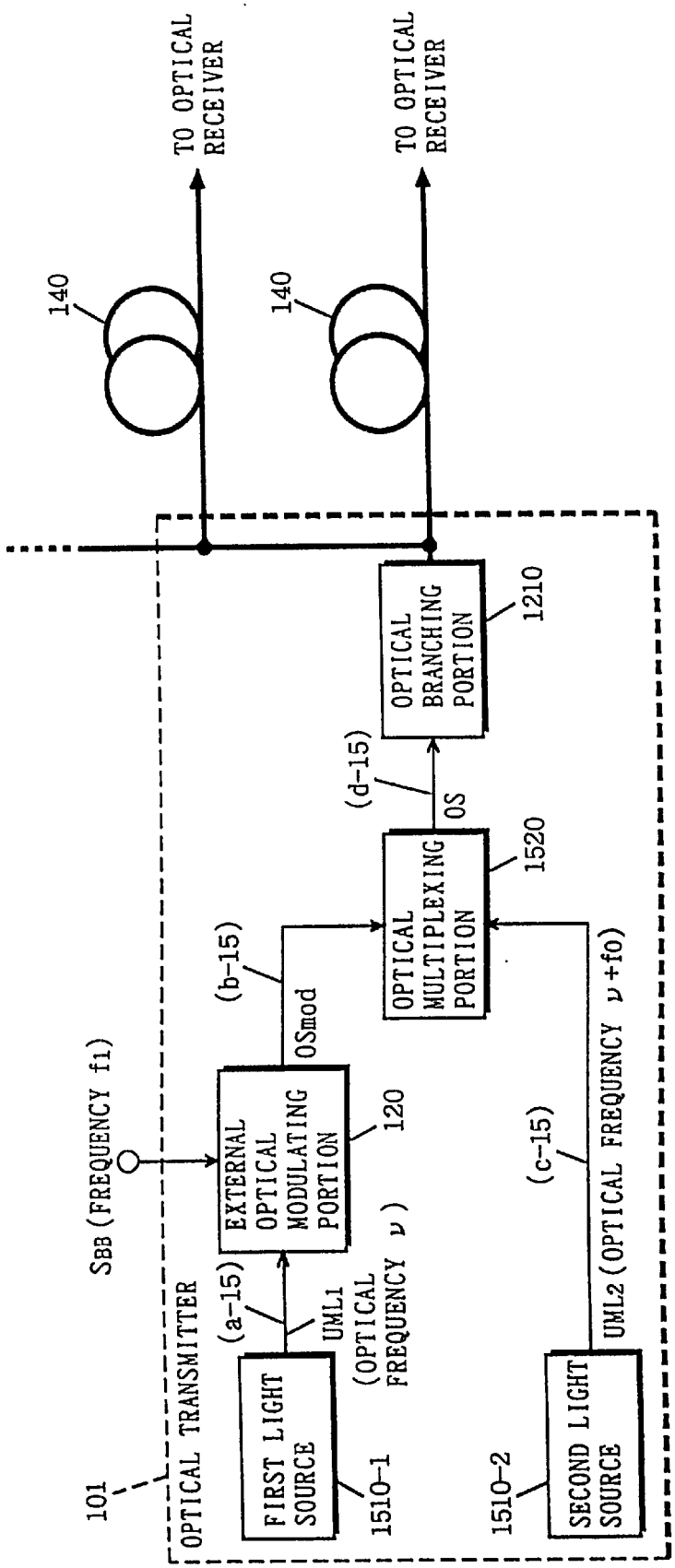
FIG. 15 is a block diagram showing the structure of only an optical transmitter with respect to an optical transmitter-receiver according to a tenth embodiment of the present invention.
Figure 16:
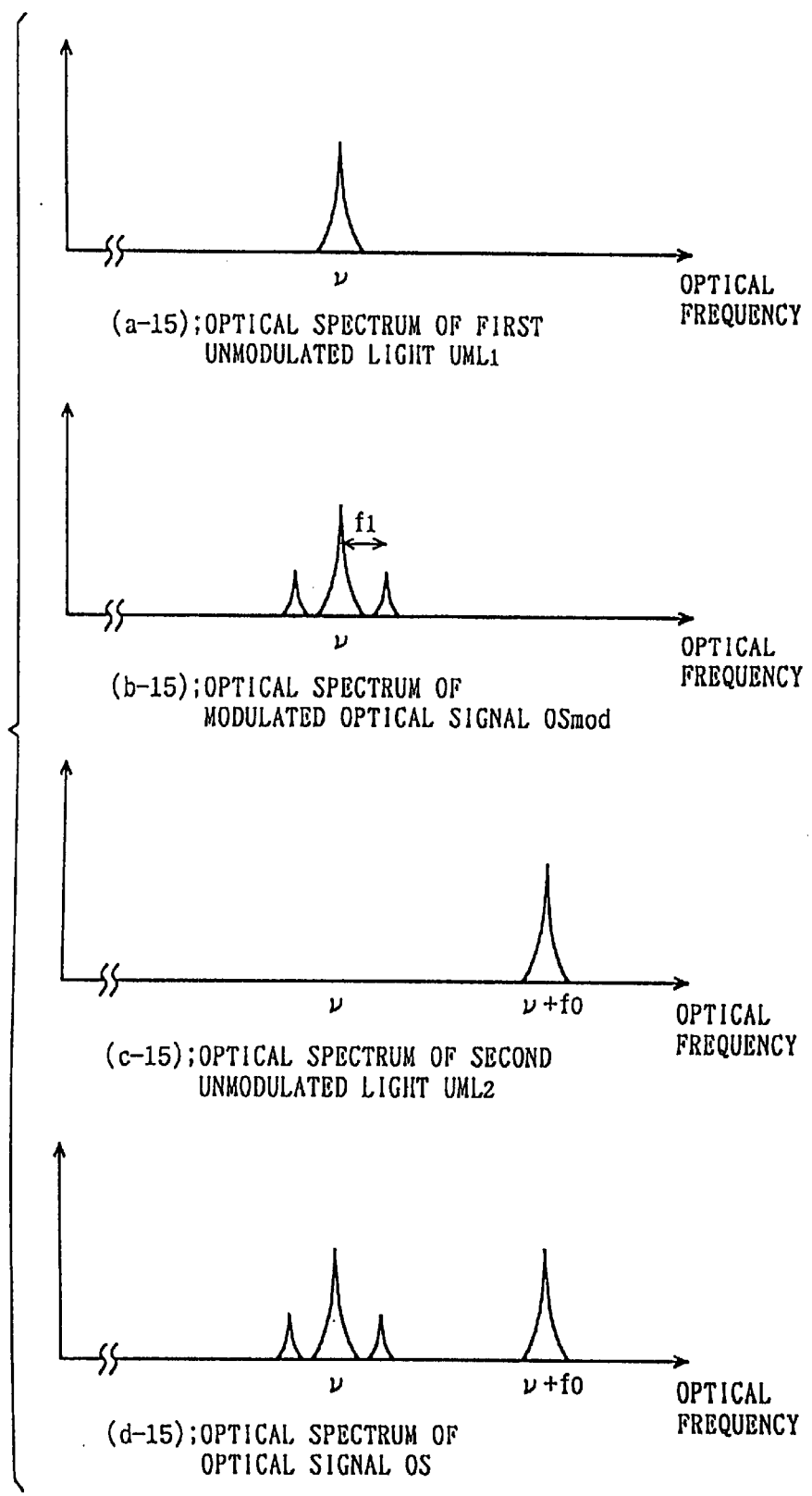
FIGS. 16(*a*-15) to (*d*-15) schematically illustrate spectrums of signals in principal parts (*a*-10) to (*d*-15) of the optical transmitter shown in FIG. 15.
Figure 17:
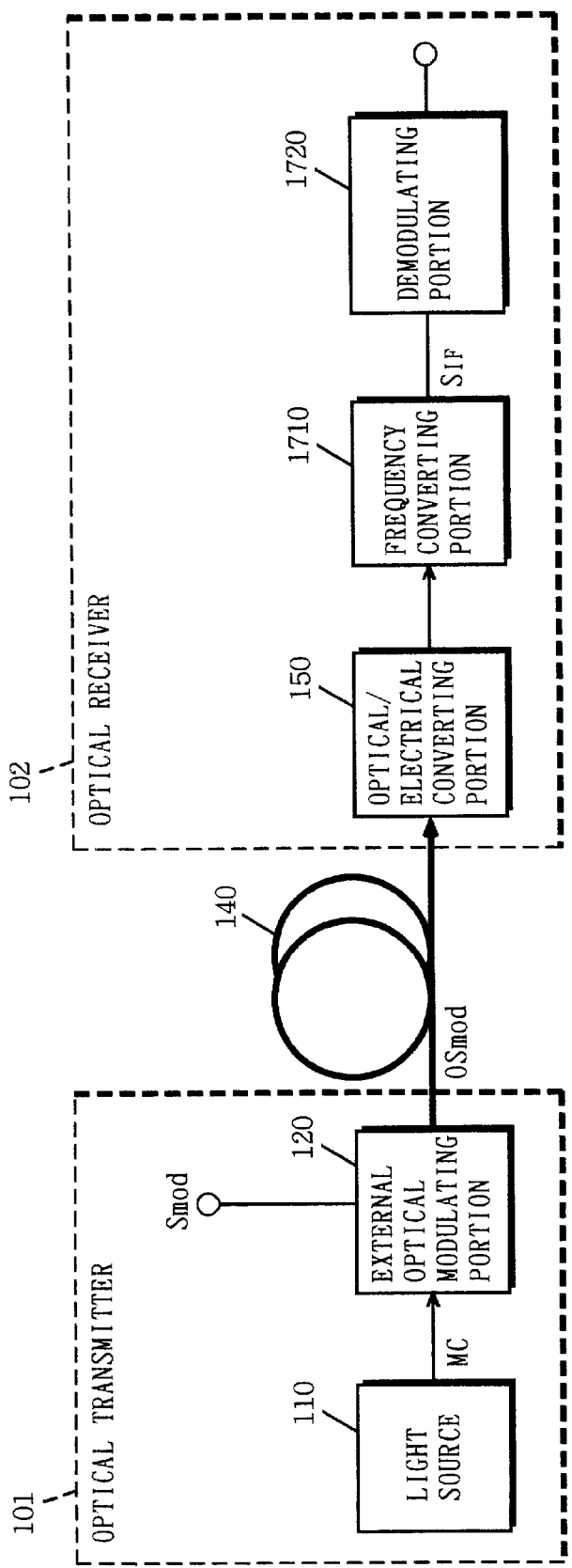
FIG. 17 is a block diagram showing the structure of a conventional first optical transmitter-receiver.
Figure 18:
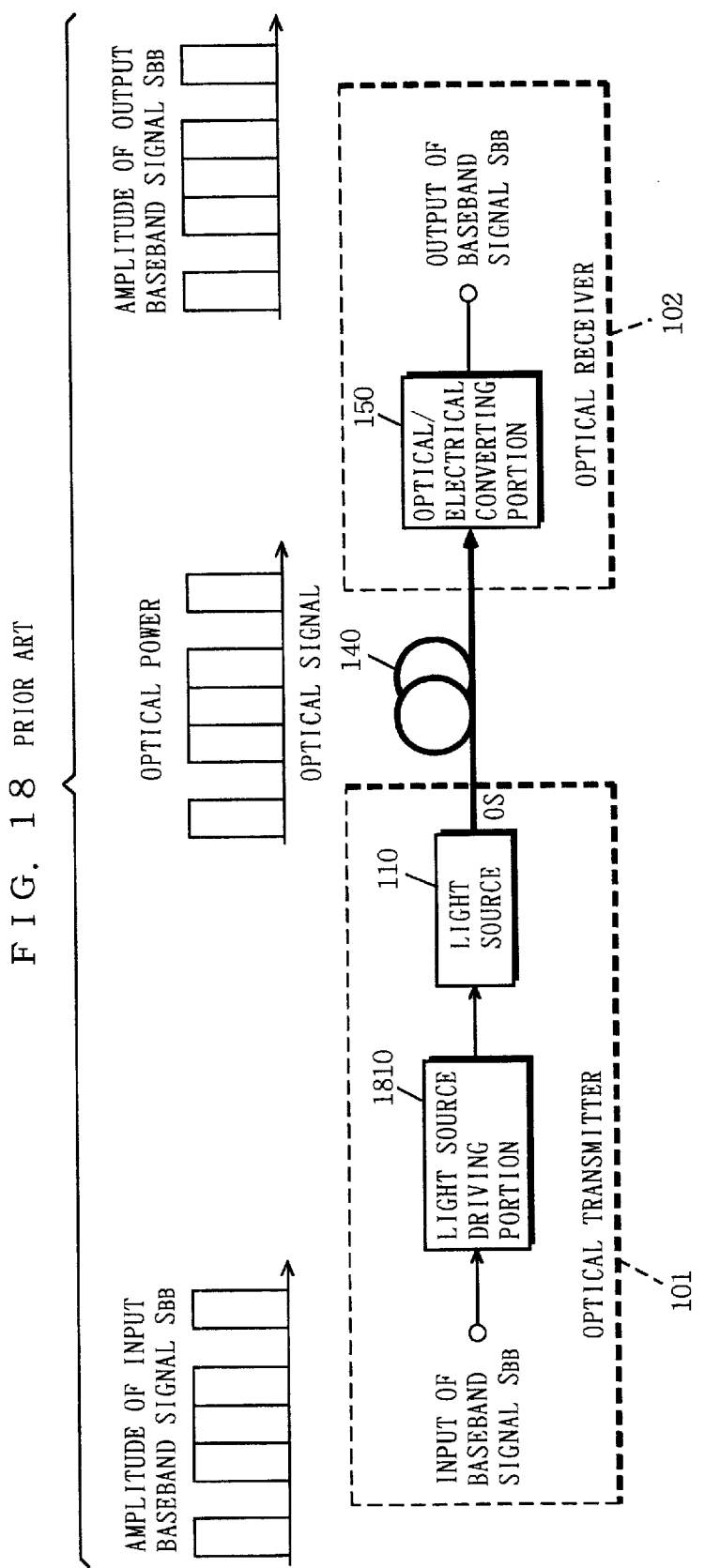
FIG. 18 is a block diagram showing the structure of a conventional second optical transmitter-receiver.

FIG. 15 is a block diagram showing the structure of only an optical transmitter with respect to an optical transmitter-receiver according to a tenth embodiment of the present invention. Although an optical receiver is not illustrated in FIG. 15, the optical receivers 102-1 and 102-2 shown in FIG. 12 or the optical receiver 102 shown in FIG. 13 can be connected. AN optical transmitter 101 shown in FIG. 15 comprises a first light source 1510-1, a second light source 1510-2, an external optical modulating portion 120, an optical multiplexing portion 1520, and an optical branching portion 1210. In the optical transmitter 101 shown in FIG. 15, the same reference numerals are assigned to components corresponding to the components of the optical transmitter shown in FIG. 14 and hence, the description thereof is simplified. FIGS. 16(*a*-15) to (*d*-15) schematically illustrate spectrums of signals in principal parts (*a*-15) to (*d*-15) of the optical transmitter-receiver shown in FIG. 15.

The operations of the optical transmitter-receiver according to the tenth embodiment will be described on the basis of FIGS. 15 and 16. In the optical transmitter 101, the first light source 1510-1 outputs first unmodulated light $UML_1$ having an optical frequency $v$ to the external optical modulating portion 120. The first unmodulated light $UML_1$ has an optical spectrum as shown in FIG. 16(*a*-15). Further, a baseband signal $S_{BB}$ having a frequency $f_1$ is inputted to the external optical modulating portion 120 from the outside of the optical transmitter 101. The external optical modulating portion 120 amplitude-modulates the inputted first unmodulated light $UML_1$ by the inputted baseband signal $S_{BB}$, to produce a modulated optical signal $OS_{mod}$, as described in the second embodiment. The optical spectrum of the modulated optical signal $OS_{mod}$ has a component of the first unmodulated light $UML_1$ at a center optical frequency $v$, and further has components of sidebands at frequencies spaced an integral multiple of the optical frequency $f_1$ apart from the optical frequency $v$ (only $\pm f_0$ are illustrated), as shown in FIG. 16(*b*-15). The modulated optical signal $OS_{mod}$ is inputted to the optical multiplexing portion 1520.

The second light source 1510-2 outputs second unmodulated light $UML_2$ spaced a predetermined optical frequency apart from the optical frequency corresponding to the frequency $f_0$ of the above-mentioned subcarrier SC. The second unmodulated light $UML_2$ has the optical spectrum as shown in FIG. 16(*c*-15). The optical multiplexing portion 1520 multiplexes the inputted modulated optical signal $OS_{mod}$ and the second unmodulated light $UML_2$ such that their polarized waves coincide with each other, and outputs a signal obtained by the multiplexing to the optical branching portion 1210 as an optical signal OS. The optical signal OS has the optical spectrum as shown in FIG. 16(*d*-15) because it is obtained by merely multiplexing the modulated optical signal $OS_{mod}$ and the second unmodulated light $UML_2$. It is found by referring to FIG. 16(*d*-15) that the optical spectrum of the optical signal OS is the same as that in the case where the single sideband amplitude modulation system described in the eighth embodiment is applied. Consequently, the optical transmitter 101 constructed as shown in FIG. 15 also produces the same effect as that in the case where the single sideband amplitude modulation system described in the eighth embodiment is applied. Further, in the present embodiment, it is possible to optically transmit the baseband signal $S_{BB}$ and a modulated electrical signal $S_{mod}$ using not the local oscillating portion 170 as in the eighth embodiment but only the two light sources (the first light source 1510-1 and the second light source 1510-2). Consequently, the optical/electrical conversion must be made twice in the first external optical modulating portion 120-1 and the second external optical modulating portion 120-2 in the eighth embodiment, for example, while the optical/electrical conversion is made only once by the external optical modulating portion 120 in the optical transmitter 101 according to the present embodiment. It is possible to realize low-loss optical transmission by thus reducing the number of times of optical/electrical conversion. Further, the optical transmitter 101 according to the present embodiment requires no electrical component for amplitude-modulating the subcarrier by the electrical signal to be transmitted. That is, according to the present embodiment, the necessity of an electrical component, which is high in cost and is difficult to process, corresponding to a subcarrier band which is a relatively high frequency is eliminated. Correspondingly, the optical transmitter-receiver can be constructed simply and at low cost. Further, the oscillation optical frequencies of the two light sources can be easily changed by changing their bias currents and ambient temperatures. Therefore, the frequency band of the modulated electrical signal $S_{mod}$ obtained on the side of the optical receiver can be easily changed.

In the tenth embodiment, description was made, letting $v$ be the oscillation optical frequency of the first light source 1510-1 and $v+f_0$ be the oscillation optical frequency of the second light source 1510-2, as can be seen by referring to FIG. 16. However, the oscillation optical frequency of the second light source 1510-2 may be $v-f_0$.

In each of the above-mentioned embodiments, in a case where the baseband signal is analog information, when the analog information is optically transmitted with the subcarrier SC modulated by the analog information, the optical/electrical converting portions 150, 150-1 and 150-2 typically square-law detect the optical signal, so that accurate square-law detection may, in some cases, be interfered with by secondary high harmonics. On the side of the optical transmitter 101, the baseband signal which is the analog information is analog-to-digital converted, and the baseband signal which is digital information obtained by the conversion is optically transmitted with the subcarrier modulated by the baseband signal. The optical receiver 102 or the like digital-to-analog converts the optical signal after the optical/electrical conversion. Consequently, the optical transmitter-receiver can transmit information high in quality which is not interfered with by higher harmonics.

In the optical transmitter-receiver according to each of the embodiments, the baseband signal is inputted from outside. If a carrier having an intermediate frequency is previously modulated by the baseband signal using a predetermined modulation system (amplitude modulation, frequency modulation or phase modulation), and a signal obtained by modulating the carrier having the intermediate frequency is optically transmitted after the subcarrier SC outputted from the local oscillating portion 170 is modulated by the signal, however, the carrier having the intermediate frequency and a signal in which the subcarrier SC is modulated by the carrier having the intermediate frequency can be obtained in the optical receiver according to each of the embodiments, so that optical transmission which does not depend on a modulation form is possible. The intermediate frequency is limited to a lower frequency than the frequency $f_0$ of the subcarrier SC. The reason for this is that if a component of the carrier having the intermediate frequency is not included between $v \pm f_0$, it is difficult to accurately perform optical/electrical conversion and filtering.

In the optical transmitter-receiver according to each of the embodiments, a plurality of carriers respectively having different intermediate frequencies are previously prepared, the carriers having different intermediate frequencies are respectively modulated by different baseband signals, and a frequency division multiplexing access is further employed, so that it is possible to collectively optically transmit the carriers.

A time division multiplexing access or a code division multiplexing access is employed for the optical transmitter-receiver according to each of the embodiments, so that different baseband signals can be transmitted upon being multiplexed on a single carrier having an intermediate frequency. Further, more information can be transmitted upon being multiplexed by simultaneously using the frequency division multiplexing access and the time division multiplexing access or the code division multiplexing access.

As described in the foregoing, an optical spectrum of a double-amplitude-modulated optical signal is divided into a component of a sideband and components of a main carrier and the other sideband by optical filtering, and the components are respectively optically transmitted, so that a baseband signal to be transmitted and a modulated electrical signal in which a subcarrier is modulated by the baseband signal to be transmitted can be simultaneously obtained after the optical/electrical conversion. The modulated electrical signal is suitable for wireless transmission if it has a microwave band or a millimeter-wave band. According to the optical transmitter-receiver, therefore, it is possible to construct a system in which a wire communication network by an optical fiber and a wireless transmission system utilizing a modulated electrical signal (a signal having a high frequency such as a microwave band or a millimeter-wave band). Moreover, in the optical transmitter, only one light source is used, which is advantages in terms of construction of the optical transmitter-receiver, the maintenance cost, and the like.

When an optical signal having a band of 1.5 $\mu$m whose transmission loss is the minimum is transmitted through a single 1.3 $\mu$m band single mode fiber generally used, a modulation component disappears by several kilometers due to dispersion in a normal optical signal generally amplitude-modulated by a signal having a high frequency such as a millimeter-wave band. However, the optical transmitter-receiver is not affected by dispersion because it receives an amplitude-modulated optical signal having only a component of one sideband.

Furthermore, an erbium doped fiber amplifier (EDFA) can be also used by using an optical signal having a band of 1.5 $\mu$m, so that it is also possible to improve the receiving sensitivity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical transmitter-receiver in which an optical transmitter and at least one optical receiver are interconnected for optical transmission, comprising:
   a double-modulating portion for double-modulating a main carrier, which is unmodulated light having a predetermined optical frequency, by an externally provided subcarrier modulated by an electrical signal to be transmitted, to produce and output a double-modulated optical signal,
   an optical spectrum of said double-modulated optical signal produced from said double-modulating portion including a component of said main carrier at said predetermined optical frequency and further including components of an upper sideband and a lower sideband at frequencies spaced by the frequency of said subcarrier apart from the predetermined optical frequency;
   an optical filter portion for passing an optical signal including the component of either one of said upper sideband and said lower sideband in said double-modulated optical signal inputted from said double-modulating portion; and
   a first optical-electrical converting portion for converting said optical signal inputted from said optical filter portion into said electrical signal to be transmitted,
   said optical transmitter comprising at least said double-modulating portion, said optical receiver comprising at least said first optical-electrical converting portion, and said optical filter portion being included in either one of the optical transmitter and the optical receiver.

2. The optical transmitter-receiver according to claim 1, wherein said double-modulating portion comprises:
   a light source for outputting said main carrier; and
   an external optical modulating portion for amplitude-modulating, using an external optical modulation, said main carrier inputted from said light source by a subcarrier amplitude-modulated by an externally provided electrical signal to be transmitted.

3. The optical transmitter-receiver according to claim 1, wherein the subcarrier amplitude-modulated by said electrical signal to be transmitted is a signal externally provided through wireless transmission, and said optical transmitter-receiver further comprises
   an antenna portion receiving said signal through wireless transmission for supply to said double-modulating portion.

4. The optical transmitter-receiver according to claim 3, wherein said electrical signal to be transmitted is a multichannel signal frequency-multiplexed, and said subcarrier amplitude-modulated by said multichannel signal is received by said antenna portion.

5. The optical transmitter-receiver according to claim 3, wherein
   said electrical signal to be transmitted is digital information, and
   said subcarrier is OOK (on-off keying)-modulated by said digital information is received by said antenna portion.

6. The optical transmitter-receiver according to claim 1, wherein said double-modulating portion comprises:
   a light source for outputting said main carrier;
   a first external optical modulating portion for amplitude-modulating said main carrier inputted from said light source by said subcarrier externally provided to generate a modulated optical signal; and
   a second external optical modulating portion for amplitude-modulating said modulated optical signal inputted from said first external optical modulating portion by said electrical signal to be transmitted that is externally provided.

7. The optical transmitter-receiver according to claim 1, wherein said double-modulating portion comprises:
   a mode locked light source for generating and outputting a modulated optical signal by being mode-locked with said subcarrier externally provided; and an external optical modulating portion for generating said double-modulated optical signal by amplitude-modulating said modulated optical signal received from said mode locked light source by said electrical signal to be transmitted that is externally provided.

8. The optical transmitter-receiver according to claim 1, further comprising:
   an optical branching portion for branching the optical signal inputted from said optical filter portion into a first optical signal and a second optical signal, and outputting the first and second optical signals;
   said first optical-electrical converting portion converting said first optical signal inputted from said optical branching portion into said electrical signal to be transmitted,
   a second optical-electrical converting portion for outputting as a detecting signal an electrical signal obtained by converting said second optical signal inputted from said optical branching portion; and
   a wavelength control portion for detecting the average values of detected signals inputted from said second optical-electrical converting portion at predetermined time intervals, and controlling a wavelength of the double-modulated optical signal outputted from said double-modulating portion on the basis of the maximum value of the detected average values.

9. The optical transmitter-receiver according to claim 1, wherein
   said optical transmitter is connected to a first optical receiver and a second optical receiver for optical transmission,
   said optical transmitter further comprises:
      a local oscillating portion for outputting a subcarrier having a predetermined frequency to said double-modulating portion;
   said double-modulating portion double-modulates the main carrier, which is unmodulated light having a predetermined optical frequency, by an externally provided electrical signal to be transmitted and said subcarrier inputted from said local oscillating portion, to produce and output a double-modulated optical signal,
   said optical filter portion divides said double-modulated optical signal inputted from said double-modulating portion into a first optical signal including the component of either one of said upper sideband and said lower sideband and a second optical signal including the component of said main carrier and the component of the other one of said upper sideband and said lower sideband, to output the first optical signal and the second optical signal,
   said first optical receiver converts, through optical-electrical conversion by said first optical-electrical converting portion included therein, said first optical signal transmitted from said optical filter portion into said electrical signal to be transmitted, and
   said second optical receiver converts, through optical-electrical conversion by a second optical-electrical converting portion included therein, said second optical signal transmitted from said optical filter portion into said subcarrier modulated by said electrical signal to be transmitted.

10. The optical transmitter-receiver according to claim 9, wherein said double-modulating portion comprises:
   an electrical modulating portion for amplitude-modulating said subcarrier inputted from said local oscillating portion by said externally provided electrical signal to be transmitted, to produce and output a modulated electrical signal;
   a light source for outputting said main carrier which is unmodulated light having a predetermined optical frequency; and
   an external optical modulating portion for amplitude-modulating said main carrier inputted from said light source by said modulated electrical signal inputted from said electrical modulating portion, to produce said double-modulated optical signal.

11. The optical transmitter-receiver according to claim 10, wherein
   said electrical signal to be transmitted carries digital information, and
   said electrical modulating portion OOK (on-off keying)-modulates said subcarrier by said digital information.

12. The optical transmitter-receiver according to claim 9, wherein said double-modulating portion comprises:
   a light source for outputting said main carrier, which is unmodulated light having a predetermined optical frequency;
   a first external optical modulating portion for amplitude-modulating said main carrier inputted from said light source by said subcarrier inputted from said local oscillating portion, to produce and output a modulated optical signal, and
   a second external optical modulating portion for amplitude-modulating said modulated optical signal inputted from said first external optical modulating portion by said externally provided electrical signal to be transmitted, to produce said double-modulated optical signal.

13. The optical transmitter-receiver according to claim 9, wherein said double-modulating portion comprises:
   a light source for outputting said main carrier, which is unmodulated light having a predetermined optical frequency;
   a first external optical modulating portion for amplitude-modulating said main carrier inputted from said light source by said externally provided electrical signal to be transmitted, to produce and output a modulated optical signal; and
   a second external optical modulating portion for amplitude-modulating said modulated optical signal inputted from said first external optical modulating portion by said subcarrier inputted from said location oscillating portion, to produce said double-modulated optical signal.

14. The optical transmitter-receiver according to claim 9, wherein said optical filter portion comprises
   an optical circulator portion for outputting said double-modulated optical signal inputted from said double-modulating portion as it is; and
   an optical fiber grating portion for reflecting the component of either one of said upper sideband and said lower sideband in said double-modulated optical signal inputted from said optical circulator portion, to produce and output said first optical signal to said optical circulator portion, and passing the component of said main carrier and the component of the other one of said upper sideband and said lower sideband, to produce and output said second optical signal to the second optical-electrical converting portion of said second optical receiver, wherein said optical circulator portion further outputs said first optical signal inputted from said optical fiber grating portion as it is to the first optical-electrical converting portion of said first optical receiver.

15. The optical transmitter-receiver according to claim 9, wherein said second optical receiver comprises an antenna portion for radiating to space the subcarrier that is modulated by said electrical signal to be transmitted which is obtained through optical-electrical conversion by the second optical-electrical converting portion.

16. The optical transmitter-receiver according to claim 9, wherein said electrical signal to be transmitted is an electrical signal to be transmitted which is digital information converted from analog information.

17. The optical transmitter-receiver according to claim 9, wherein said electrical signal to be transmitted is obtained by modulating, by analog information or digital information, a carrier having an intermediate frequency lower than that of the subcarrier outputted from said local oscillating portion.

18. The optical transmitter-receiver according to claim 9, wherein said electrical signal to be transmitted is obtained by multiplexing, through a predetermined multiplexing technique, a plurality of electrical signals each obtained by modulating a carrier having an intermediate frequency by analog information or digital information.

19. The optical transmitter-receiver according to claim 18, wherein said predetermined multiplexing technique is a frequency division multiplexing access, a time division multiplexing access or a code division multiplexing access.

* * * * *